(12) United States Patent
Buck

(10) Patent No.: US 10,217,382 B1
(45) Date of Patent: *Feb. 26, 2019

(54) THREE-DIMENSIONAL STICKER WITH HIGH-RESOLUTION IMAGE AND REMOVABLE ADHESIVE

(71) Applicant: Ronald Mark Buck, Encinitas, CA (US)

(72) Inventor: Ronald Mark Buck, Encinitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/120,135

(22) Filed: Aug. 31, 2018

(51) Int. Cl.
*B32B 3/30* (2006.01)
*B32B 7/06* (2006.01)
(Continued)

(52) U.S. Cl.
CPC ................. *G09F 3/02* (2013.01); *B32B 3/30* (2013.01); *B32B 7/06* (2013.01); *B32B 7/12* (2013.01); *B32B 27/08* (2013.01); *B32B 27/10* (2013.01); *F21S 9/02* (2013.01); *F21V 23/0435* (2013.01); *G09F 3/10* (2013.01); *B32B 2307/409* (2013.01); *B32B 2307/4023* (2013.01); *B32B 2307/412* (2013.01); *B32B 2307/416* (2013.01);
(Continued)

(58) Field of Classification Search
CPC .... B32B 3/30; B32B 7/06; B32B 7/12; B32B 27/08; B32B 27/10; B32B 2255/10; B32B 2255/205; B32B 2307/4023; B32B 2307/409; B32B 2307/412; B32B 2307/416; B32B 2307/7265; B32B 2405/00; B32B 2451/00; B32B 2457/00; C09J 7/29; C09J 7/405; F21L 4/00; F21V 23/0435; F21V 31/005; F21V 33/008; G09F 3/02; G09F 3/10; F21S 9/02; Y10T 428/14

See application file for complete search history.

(56) References Cited

U.S. PATENT DOCUMENTS 3,758,358 A   9/1973   Kuroda
4,226,902 A * 10/1980  Webb .................... A47G 33/08
                                                    428/16

(Continued)

FOREIGN PATENT DOCUMENTS

KR      200324789 Y1    8/2003
WO      2012106052      8/2012

*Primary Examiner* — Patricia L. Nordmeyer
(74) *Attorney, Agent, or Firm* — Manuel de la Cerra

(57) ABSTRACT

A three-dimensional sticker is disclosed that includes a body. The body has the following components: a rigid main sheet constructed from a thermoformable plastic layer, and a flexible/stretchable ink layer adhered the main sheet. Additionally, the body may employ an adhesive layer comprising a repositionable adhesive adhered to the rigid main sheet and a thermoformable release liner detachably adhered to the adhesive layer. The body is thermoformed into a three-dimensional shape with an anchor region and an elevated region. The anchor region is substantially planar and defines an anchor plane, and the elevated region is outside of the anchor plane. The adhesive layer and release liner may be present in the anchor region and elevated region. Additionally, the three-dimensional sticker may comprise a multi-part construction wherein the parts can be separated from each other for easier transport and installation.

21 Claims, 23 Drawing Sheets

(51) Int. Cl.
  *B32B 7/12* (2006.01)
  *G09F 3/02* (2006.01)
  *B32B 27/10* (2006.01)
  *F21S 9/02* (2006.01)
  *F21V 23/04* (2006.01)
  *G09F 3/10* (2006.01)
  *B32B 27/08* (2006.01)

(52) U.S. Cl.
  CPC ... *B32B 2307/7265* (2013.01); *B32B 2405/00* (2013.01); *B32B 2451/00* (2013.01); *B32B 2457/00* (2013.01); *G09F 2003/0241* (2013.01)

(56) References Cited

U.S. PATENT DOCUMENTS

| | | | |
|---|---|---|---|
| 4,378,391 A | 3/1983 | Allen | |
| 5,001,853 A | 3/1991 | Odlen | |
| 5,246,757 A | 9/1993 | Condon | |
| 5,368,672 A | 11/1994 | Gunzelman | |
| 5,622,587 A * | 4/1997 | Barthelnnan | B26D 7/27 156/219 |
| 6,023,872 A | 2/2000 | Falkenstein | |
| 6,139,928 A * | 10/2000 | Sloot | B32B 3/28 428/7 |
| 6,170,881 B1 | 1/2001 | Salmon | |
| 6,857,211 B2 | 2/2005 | Grasso | |
| 8,551,379 B2 | 10/2013 | Simons | |
| 2002/0139018 A1* | 10/2002 | Grasso | G09F 3/02 40/310 |
| 2003/0086603 A1* | 5/2003 | Davidson | G06T 3/40 382/154 |
| 2004/0231211 A1 | 11/2004 | Johnson | |
| 2008/0105367 A1* | 5/2008 | Conrad | B65C 3/08 156/242 |
| 2018/0190157 A1* | 7/2018 | Quintin | G09F 3/02 |

* cited by examiner

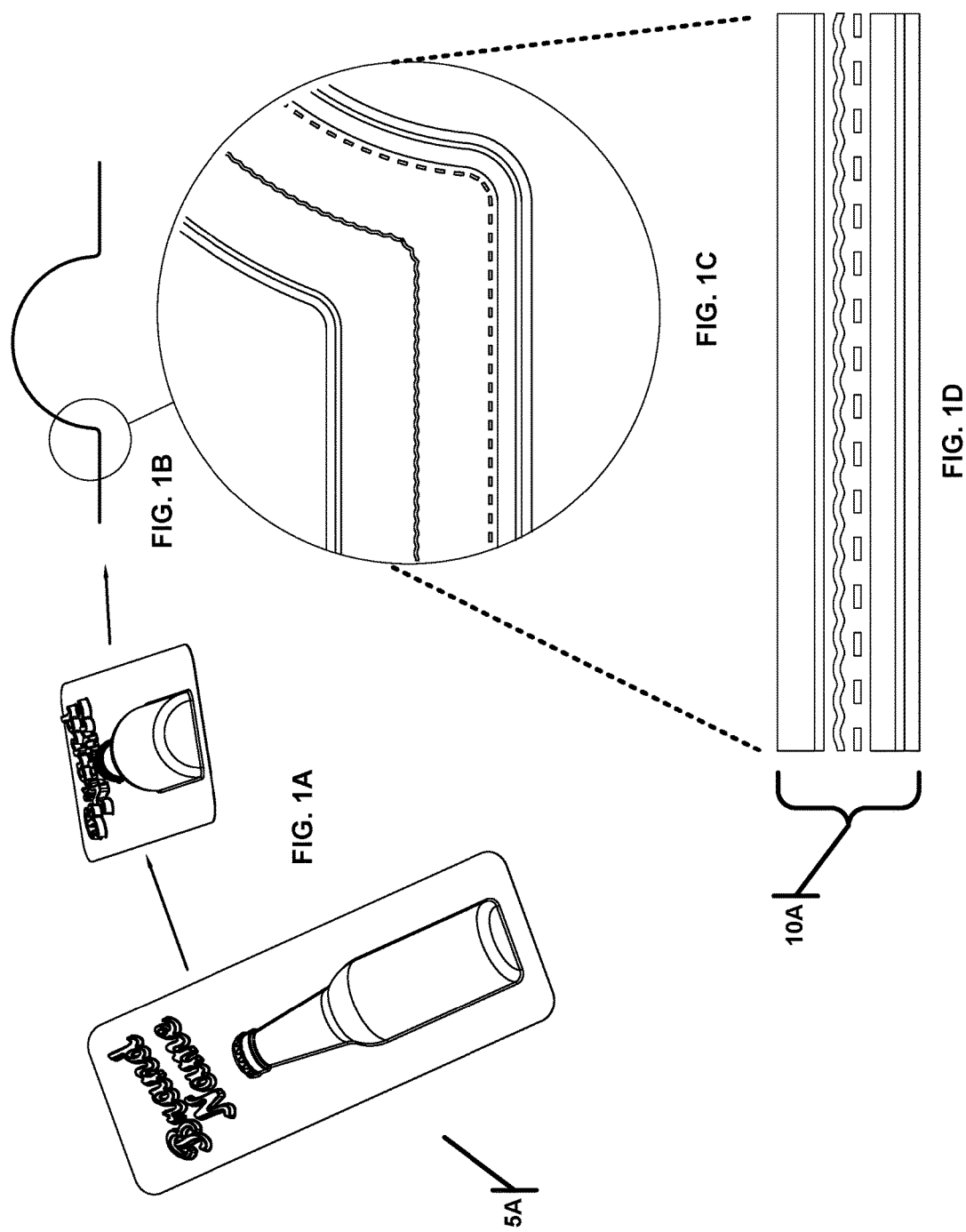

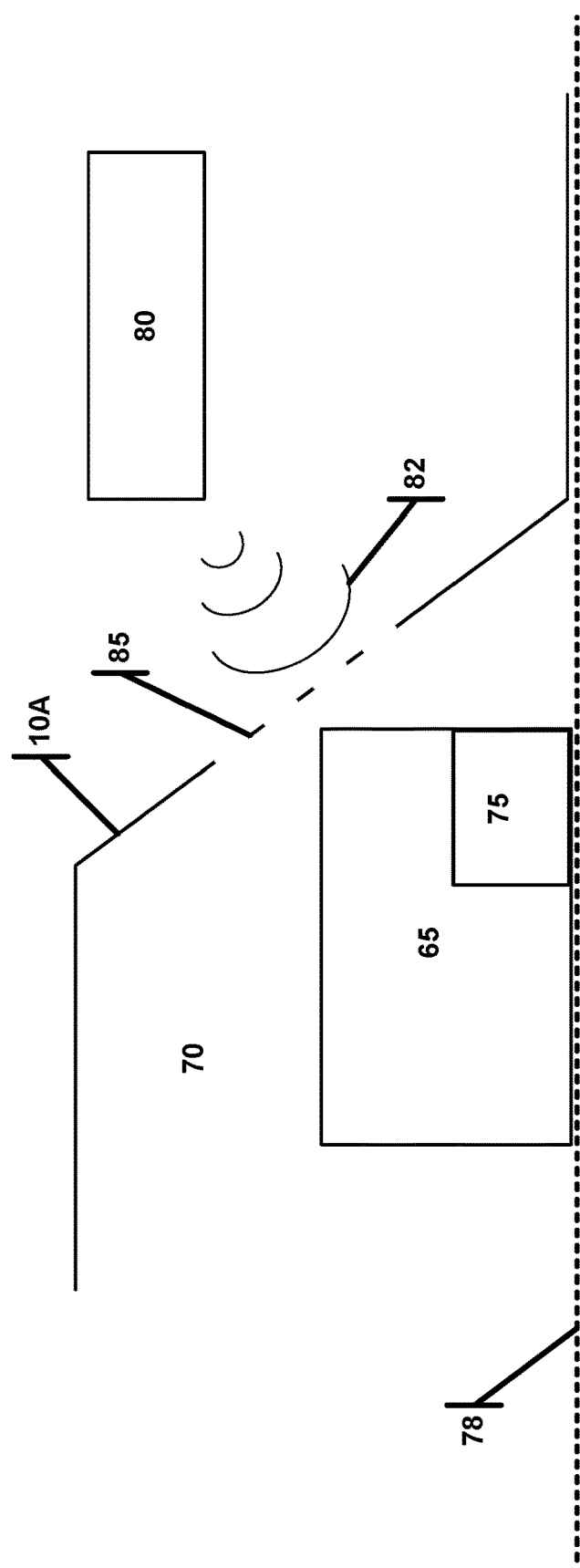

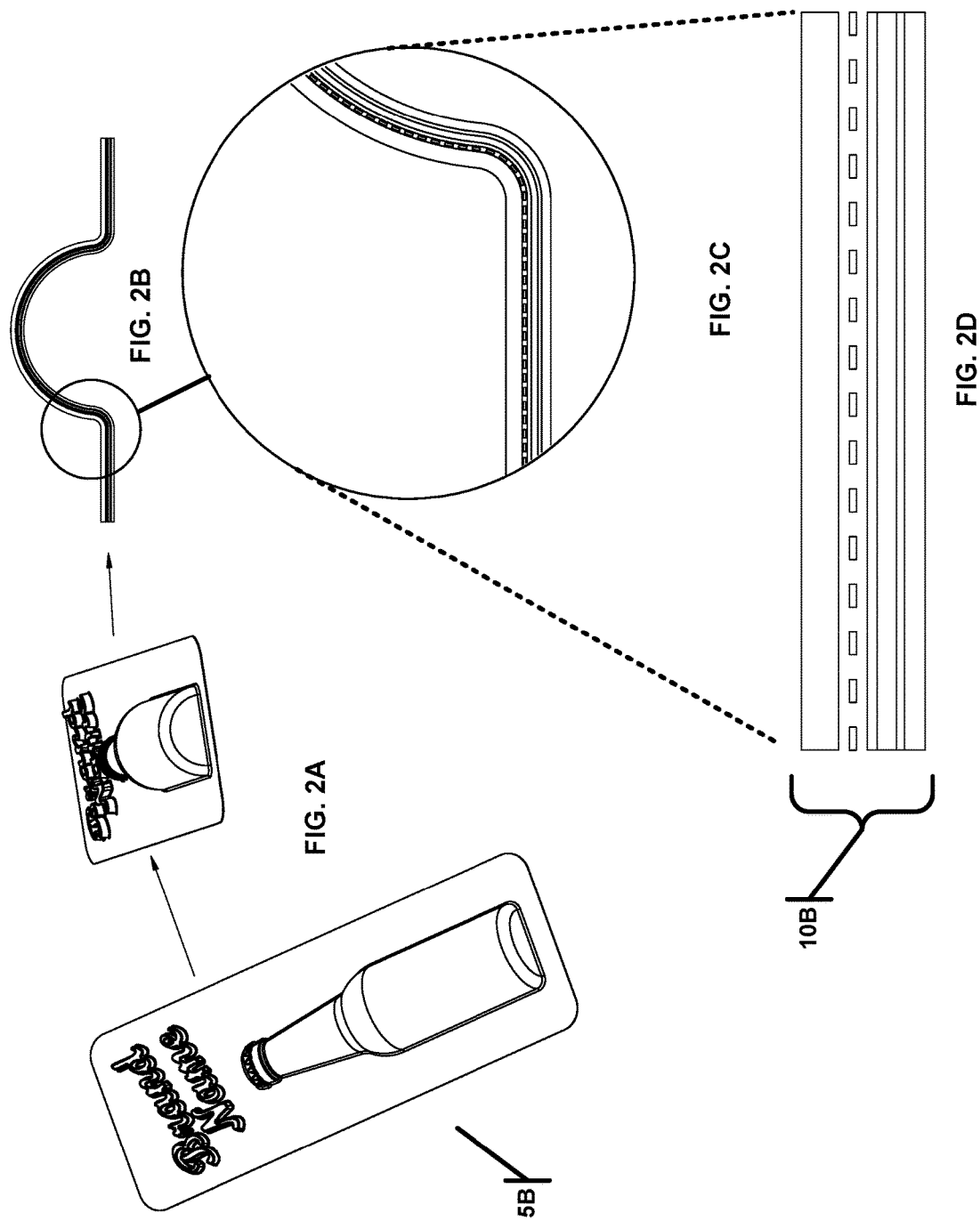

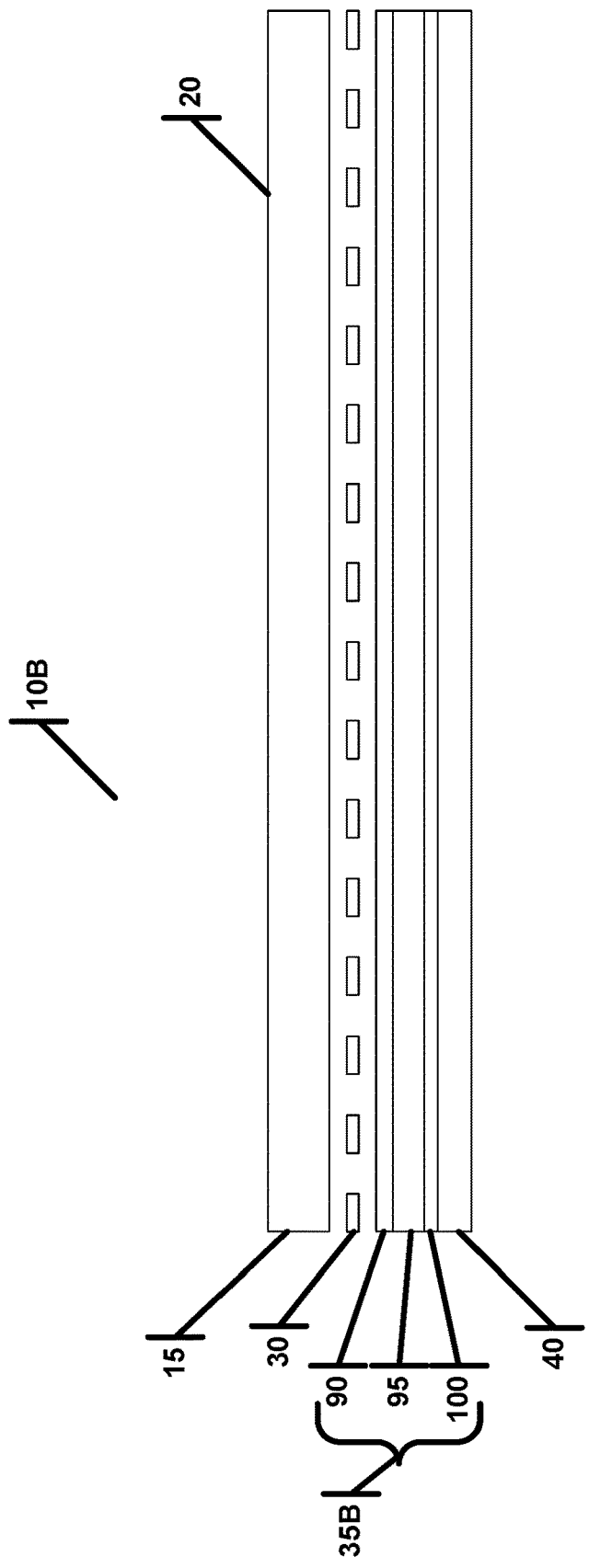

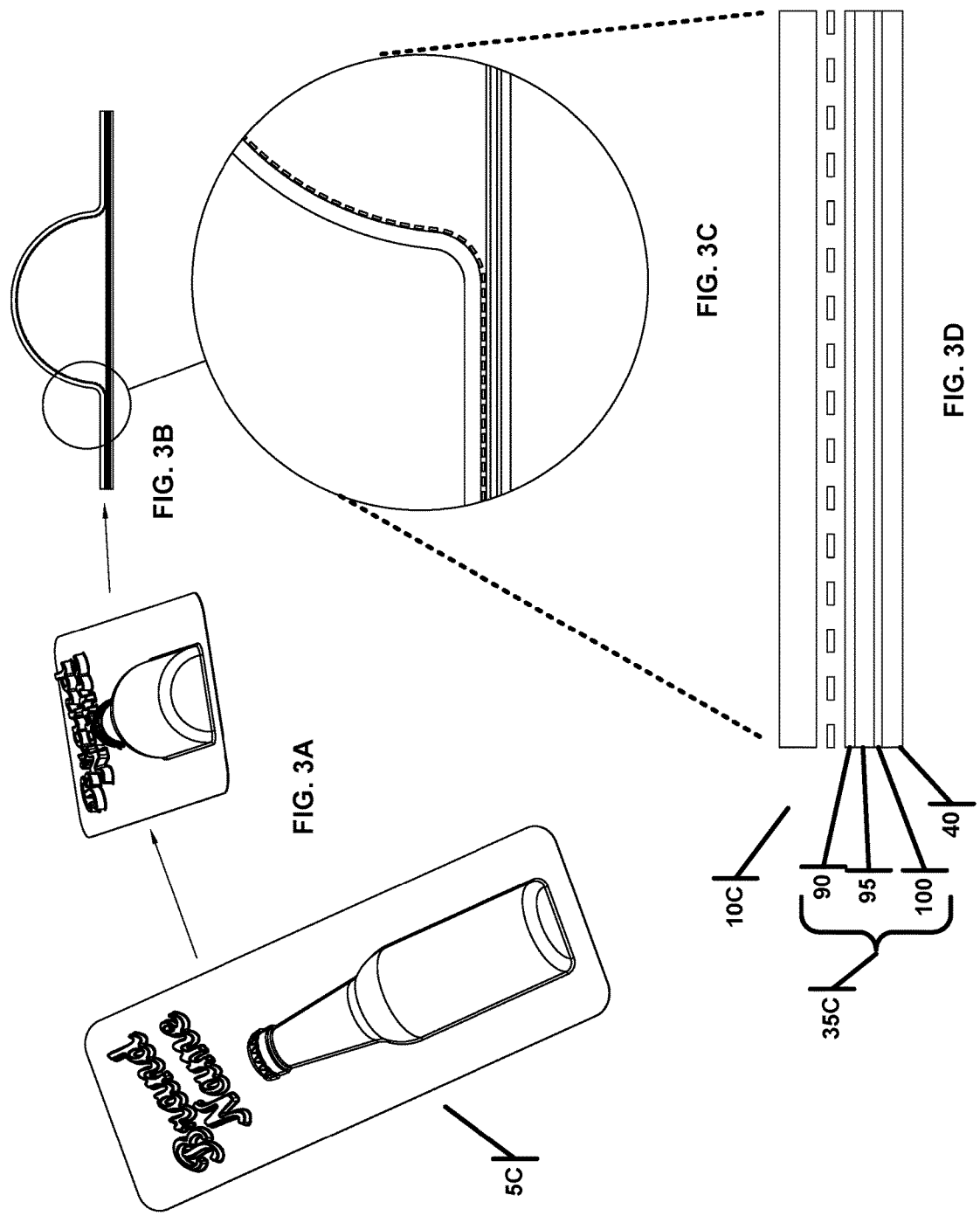

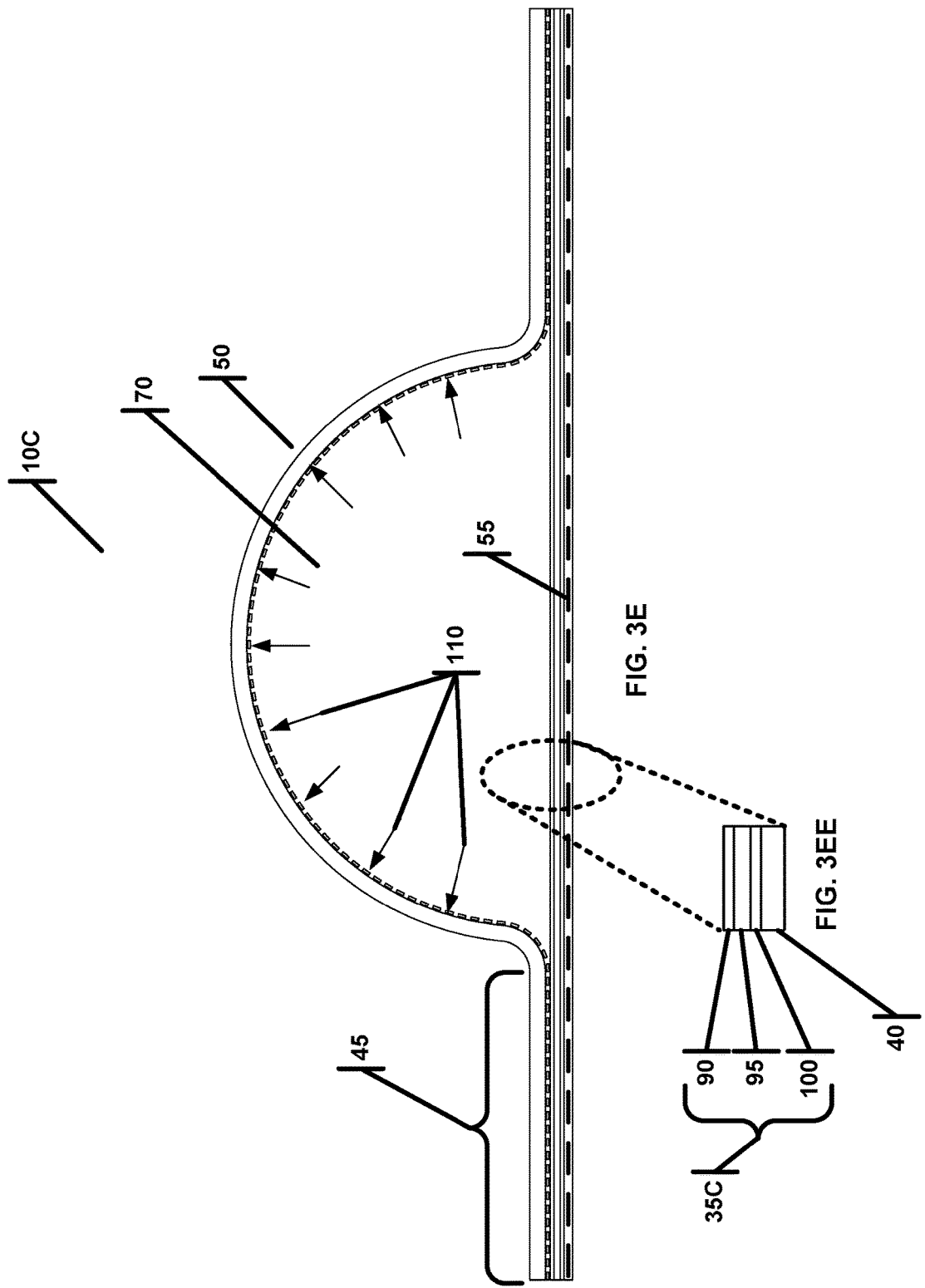

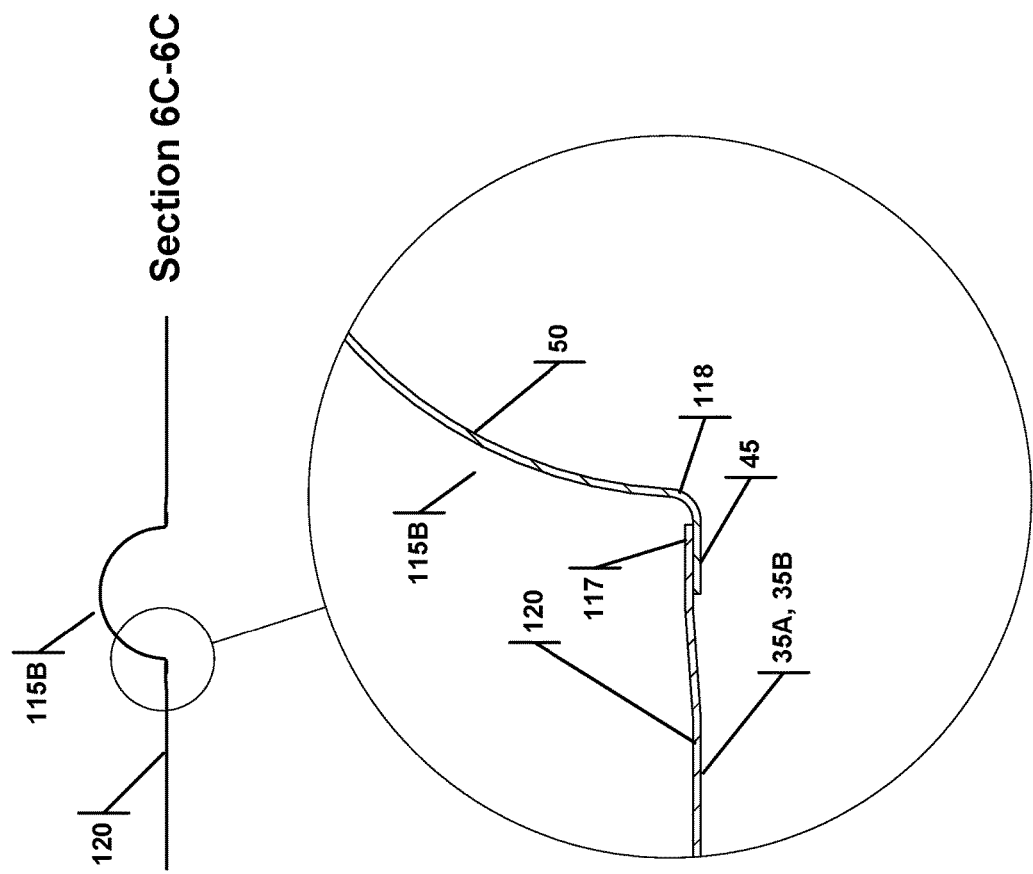

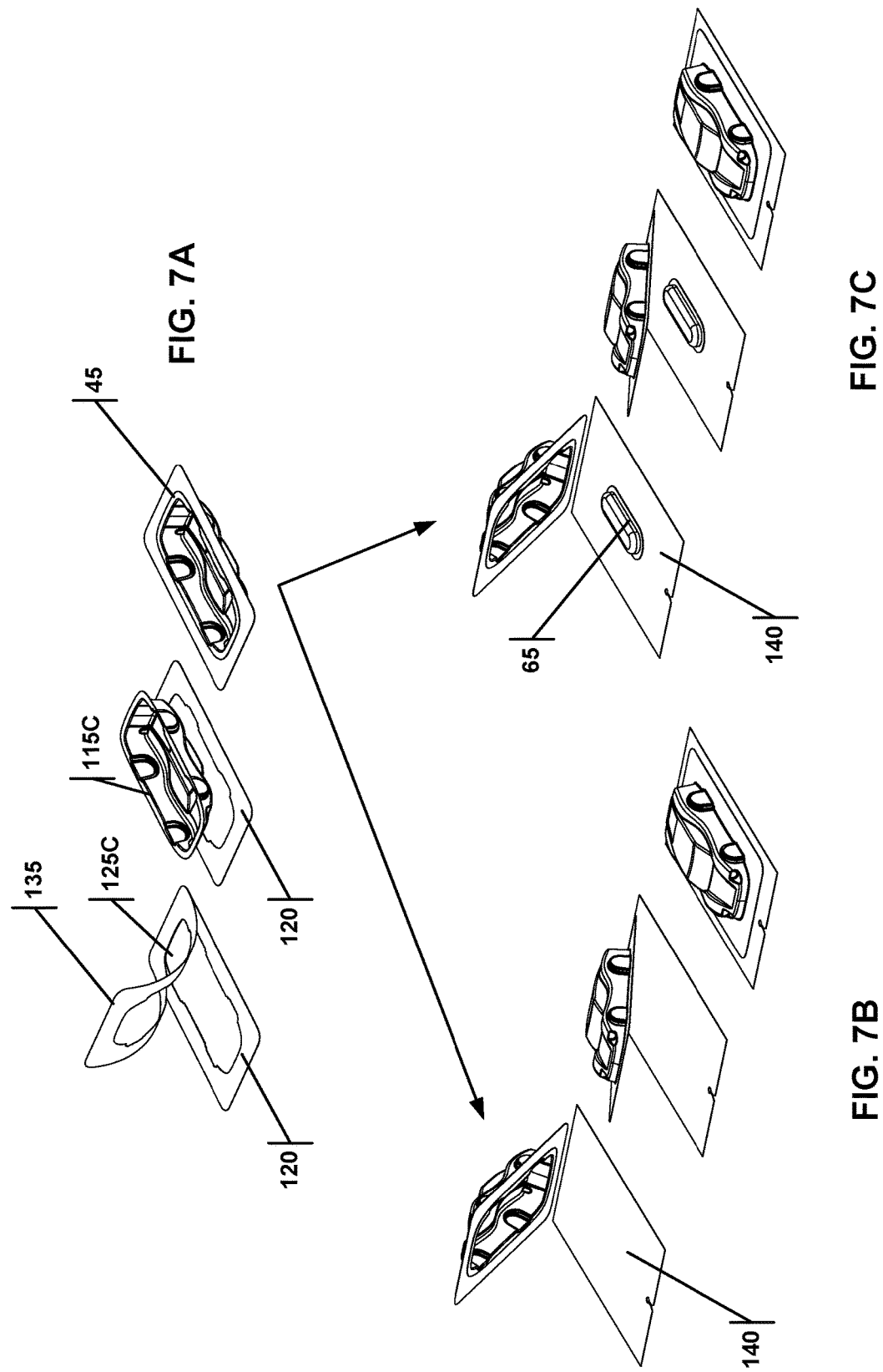

THREE-DIMENSIONAL STICKER WITH HIGH-RESOLUTION IMAGE AND REMOVABLE ADHESIVE

1.0 TECHNICAL FIELD

The present invention is related to thermoformed three-dimensional structures.

2.0 BACKGROUND

Three-dimensional thermoformed structures have long been a part of product design, and three-dimensional printing is becoming more and more popular along with computer-aided design and software tools. Some applications of using three-dimensional thermoformed shapes on promotional materials such as banners and labels for containers have been conceived. A three-dimensional shape is more interesting and captures the viewer's attention more easily than a flat two-dimensional structure, which is valuable in marketing and in aesthetic designs.

U.S. Pat. No. 6,023,872 to Falkenstein, Sr., discloses a promotional display banner made from a flexible material that includes a raised region with a predetermined shape, which may be rolled up for storage or transport. This provides a weatherproof and large-dimensioned product for displaying promotions or advertisements, but since the banner material is flexible, it must be anchored to the display site by grommets and rope or cord at the outer edges of the base sheet to prevent the banner from fluttering in the wind. Perhaps, if the banner were constructed from a more permanent rigid material, it would not need to employ grommets and rope or cord, which are a limited method for attachment compared to an adhesive layer that would allow the banner to adhere to a multitude of flat display surfaces.

U.S. Pat. No. 6,857,211 to Grasso discloses a three-dimensional label for a container, formed in a solid modeling software program such as 3-D studio or Corel. Like U.S. Pat. No. 6,023,872, the Grasso patent also teaches the printing of the template or image on a flexible material, which is additionally able to wrap around the curved surface of a bottle. It is apparent that Grasso has not contemplated the nuances which are associated with employing a rigid material because a rigid material would not wrap around the curved surface of a bottle. In Grasso, adhesive is applied only on the flat portion of the label, and not underneath the entire label. In other words, there is no adhesive under the raised or three-dimensional structure of the label, nor is there any support to help the label maintain its shape should be label be peeled away from the container. This restricts Grasso to one-time use applications, and therefore Grasso does not relate to reusable labels for containers. Also, Grasso is not suitable for larger dimensioned applications such as an entire store window, since the three-dimensional structure lacks support beneath the raised three-dimensional area.

Grasso, like Falkenstein, Sr., teaches printing the media to be displayed on a flexible material, one that is not capable of providing the support needed by the three-dimensional structure for long term use in outdoor environments.

What is needed, therefore, is a novel invention that incorporates a more rigid structure for displaying images that is designed to support three-dimensional shapes while having better characteristics, such as being repositionable, or capable of integration with electronics, such as a light contained within an elevated region that may be operated via a wireless remote. Such a solution is offered by the present invention in the form of a novel three-dimensional sticker supported by rigid thermoformable layers that can retain the sticker's three-dimensional shape even while being repositioned again and again. Electronics may be pre-applied to a display surface, and contained within an elevated region of the three-dimensional structure, and may be accessed by removing the 3-D sticker from the display surface. The 3-D sticker, due to its rigid structure and the materials selected for its construction retains its shape during the process of removing or repositioning the sticker.

3.0 SUMMARY

A three-dimensional sticker is disclosed that includes a rigid body. In a first embodiment, the body has the following components: a rigid main sheet constructed from a thermoformable plastic layer that is 10 mil-125 mil thick, a flexible/stretchable ink layer adhered the main sheet, an adhesive layer comprising a repositionable adhesive adhered to the rigid main sheet and a plastic thermoformable release liner detachably adhered to the adhesive layer. The body is thermoformed into a three-dimensional shape with an anchor region and an elevated region. The anchor region is substantially planar and defines an anchor plane, and the elevated region projects upward from the anchor plane—i.e., outside of the anchor plane. The adhesive layer and release liner are present in the anchor region and elevated region.

In a second embodiment, the body includes a rigid main sheet that may be transparent and is constructed from a thermoformable plastic layer that is 10 mil-125 mil thick, a flexible/stretchable ink layer adhered to the main sheet and an adhesive layer. The adhesive layer has three sub-layers: a first adhesive sub-layer comprised of a permanent adhesive that is preferably adhered to the ink layer, a second adhesive sub-layer comprised of a thermoformable plastic carrier sheet adhered to the first adhesive sub-layer and a third adhesive sub-layer comprised of a repositionable adhesive adhered to the second adhesive sub-layer. The body further includes a release liner detachably adhered to the third adhesive sub-layer. The release liner is comprised of a thermoformable plastic. The body is thermoformed into a three-dimensional shape with an anchor region and an elevated region. The anchor region is substantially planar and defines an anchor plane and the elevated region projects upward from the anchor plane (i.e., outside of the anchor plane). The adhesive layer and release liner are present in the anchor region and elevated region.

In a third embodiment, the body includes a rigid main sheet constructed from a thermoformable plastic layer that is 10 mil-125 mil thick, and a flexible/stretchable ink layer adhered to the main sheet. The body is thermoformed before adhering a flat adhesive layer and release liner to the anchor region of the 3-D sticker. The anchor region is substantially planar and defines an anchor plane, and the elevated region projects upward from the anchor plane (i.e., outside of the anchor plane). The anchor region further comprises regions that circumscribe the outer edges of the sticker body, especially around the raised or elevated portions of the 3-D sticker. An adhesive layer is part of the body. The adhesive layer has three sub-layers: a first adhesive sub-layer comprised of a permanent adhesive adhered to the ink layer, a second adhesive sub-layer comprised of a plastic carrier sheet adhered to the first adhesive sub-layer and a third adhesive sub-layer comprised of a repositionable adhesive adhered to the second adhesive sub-layer. The body further includes a release liner detachably adhered to the third adhesive sub-layer. The adhesive layer, and release liner, are substantially co-planar with the anchor plane, and are applied after the thermoforming process is complete, together the elevated region of the 3-D sticker and the adhesive layer form an airtight cavity. The airtight cavity is constructed to exert air pressure on the elevated portion to help maintain the three-dimensional shape of the body.

In all embodiments, the flexible/stretchable ink layer is preferably comprised of UV or LED curable inks that may be distortion printed on the main sheet and are preferably printed via high-resolution digital inkjet printing. The main sheet may be white or transparent.

The body in the first embodiment may further include, for example, a transparent protective layer adhered to the ink layer, which may provide a glossy or satin finish.

In the first and second embodiments, the sticker may include a light positioned on the anchor plane, where the light assembly resides substantially in-between the anchor plane and the elevated region, and is further positioned adjacent to the adhesive layer once the release liner has been removed. The fourth embodiment may also include a light positioned on the anchor plane. The light may be pre-applied or fastened to the application site or display surface, then the release liner is removed from the sticker, whereupon the sticker is lifted and positioned over the light and the anchor region is adhered to the application site or display surface. The embodiment may include a waterproof repositionable adhesive. Once the sticker has been applied, the light may be contained in a waterproof cavity defined by the elevated region and the display surface. The light may have a self-contained power source and a wireless remote control. The remote control may use infrared, and the body may have a transparent portion in the elevated region to allow the infrared light signal to reach the light.

In a fourth embodiment, a multi-part three-dimensional sticker is disclosed that includes at least one three-dimensional body, an anchor gasket sheet, an ink layer, a removable or repositional adhesive layer, and a release liner or transport sheet. The three-dimensional body or bodies include an anchor region and an elevated region, with the anchor region having a top surface. The elevated region and the anchor region meet at a transition which defines a shape. The body or bodies are formed from a rigid thermoformable plastic layer that is 10 mil-125 mil thick and a flexible/stretchable ink layer adhered to the rigid plastic layer. The second part is an anchor gasket sheet that is comprised of (1) a semi-rigid or rigid main sheet that is preferably plastic, but may be paper, (2) an anchor gasket ink layer adhered to the top or bottom surface (first or second side) of the semi-rigid or rigid main sheet, and (3) a removable or repositional adhesive layer adhered to the anchor gasket ink layer, or alternatively the adhesive layer may be adhered directly to the semi-rigid or rigid main sheet. The anchor gasket sheet further includes at least one complementary cutout that conforms substantially to the transition shape—i.e., the shape of the three-dimensional body. The anchor gasket sheet may further include a release liner or transport sheet detachably adhered to the removable or repositional adhesive layer.

The three-dimensional body or bodies are constructed in a similar fashion to the elevated regions that are described in the first and second embodiments; except the adhesive layer and release liner are omitted from the elevated regions. Similarly, the anchor gasket sheet employs a removable or repositional adhesive construction that is similar to the adhesive constructions which are described in the first and second embodiments.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

4.0 BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 1A illustrates a first embodiment of a 3-D sticker rotating from plan view to isometric view.

FIG. 1B is a cross-sectional view of the first embodiment of a 3-D sticker.

FIG. 1C is an enlarged cross-sectional view of the first embodiment of a 3-D sticker.

FIG. 1D is an enlarged cross-sectional view of the first embodiment of a 3-D sticker body.

FIG. 1H is a diagram illustrating the components and operation of the light disposed of in the cavity.

FIG. 2A illustrates a second embodiment of a 3-D sticker rotating from plan view to isometric view.

FIG. 2B is a cross-sectional view of the second embodiment of a 3-D sticker.

FIG. 2C is an enlarged cross-sectional view of the second embodiment of a 3-D sticker.

FIG. 2D is an enlarged cross-sectional view of the second embodiment of a 3-D sticker body.

FIG. 2E is an enlarged cross-sectional view of the second embodiment of a 3-D sticker body.

FIG. 3EE is an enlarged section of the adhesive layer and the release liner that separates from the ink layer and forms the airtight cavity.

Figure 3G:
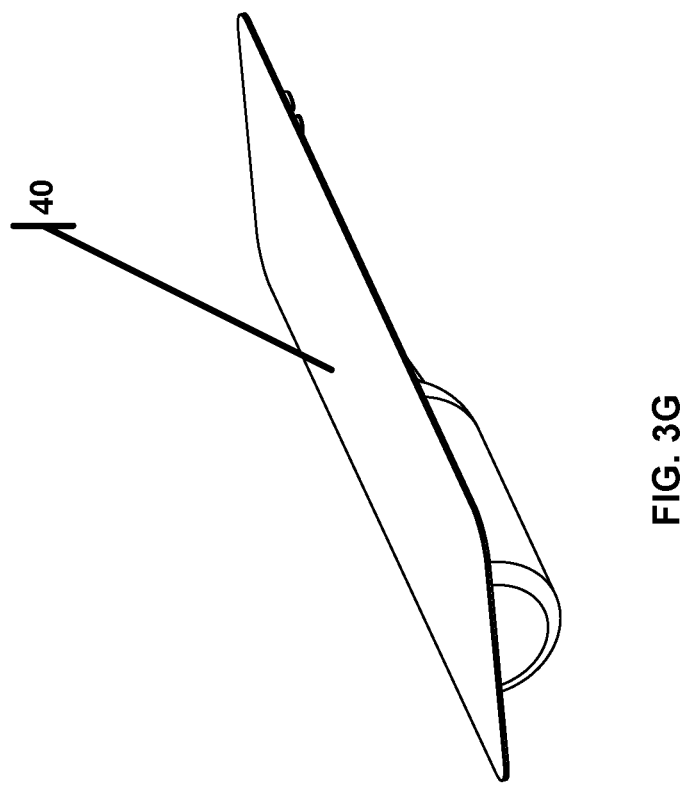
FIG. 3A illustrates a third embodiment of a 3-D sticker rotating from plan view to isometric view.
FIG. 3B is a cross-sectional view of the third embodiment of a 3-D sticker.
FIG. 3C is an enlarged cross-sectional view of the third embodiment of a 3-D sticker.
FIG. 3D is an enlarged cross-sectional view of the third embodiment of a 3-D sticker body.
FIG. 3E is an enlarged cross-sectional view of the third embodiment of a 3-D sticker body.
Figure 3F:
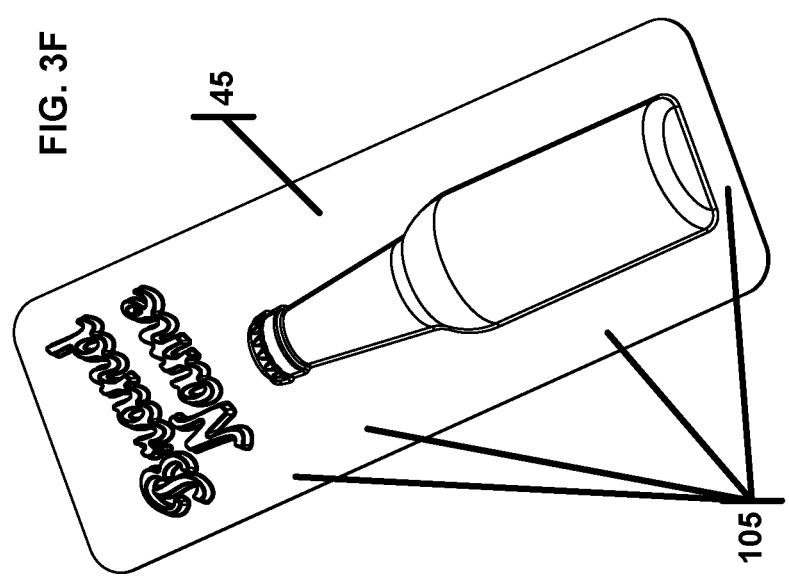

FIG. 3F is a top isometric view of the third embodiment of a 3-D sticker illustrating the anchor region circumscribing the outer edge of the sticker body.

FIG. 3G is a bottom isometric view of the third embodiment of a 3-D sticker illustrating the release liner on the back of the sticker.

Figure 3H:
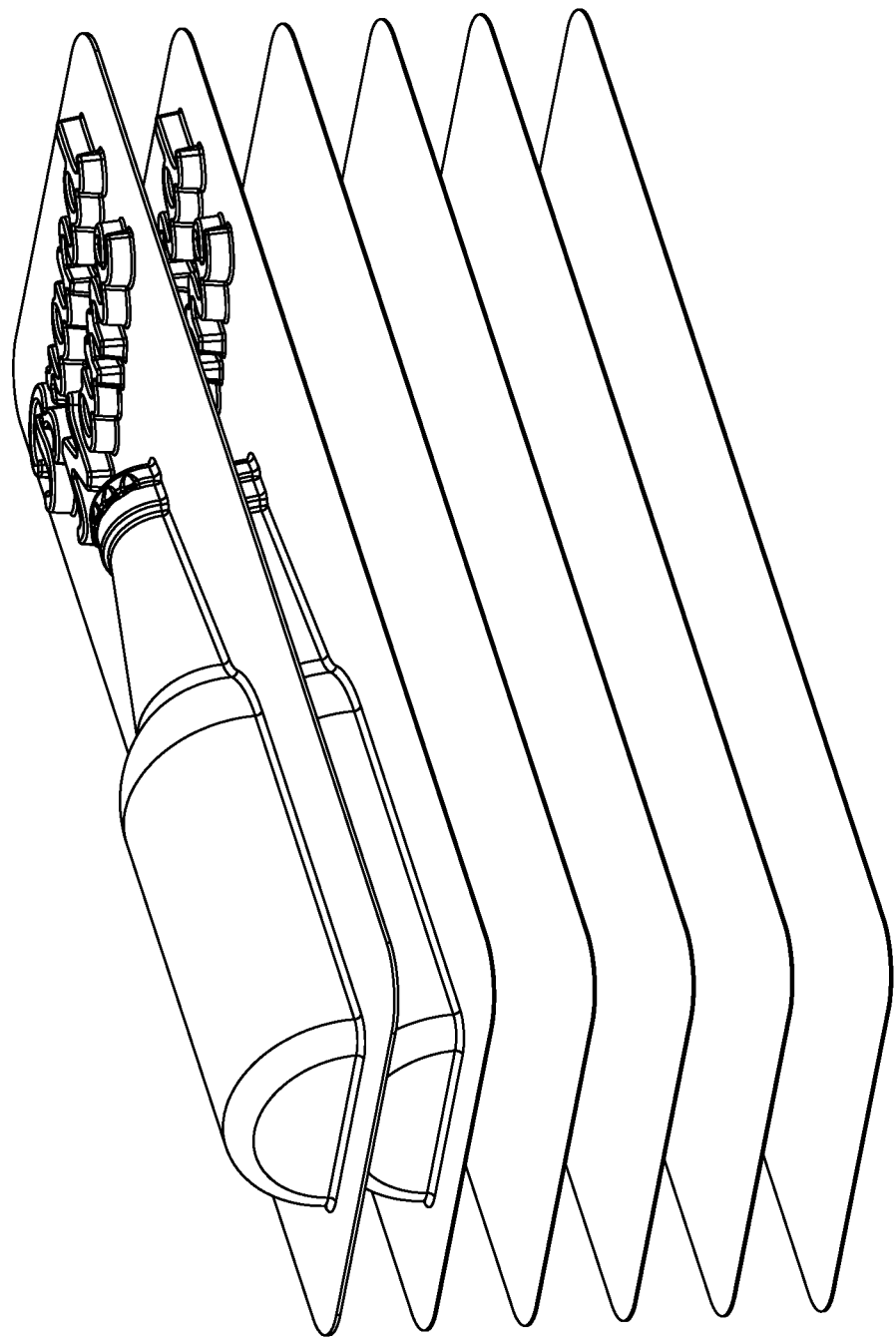

FIG. 3H illustrates an isometric view of 3-D stickers according to the third embodiment unable to nest into each other.

Figure 4C:
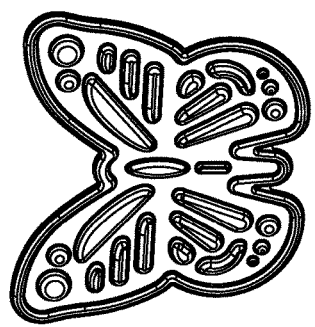
Figure 4D:
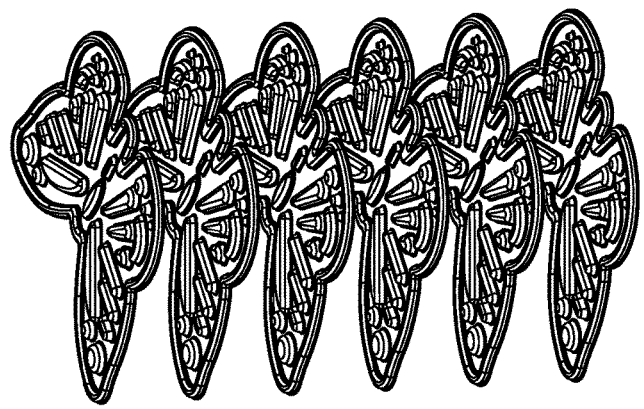
Figure 4A:
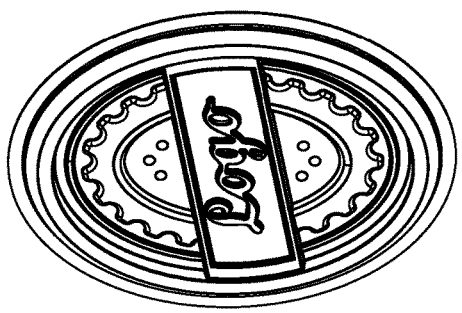

FIG. 4A illustrates a novel 3-D sticker.

Figure 4B:
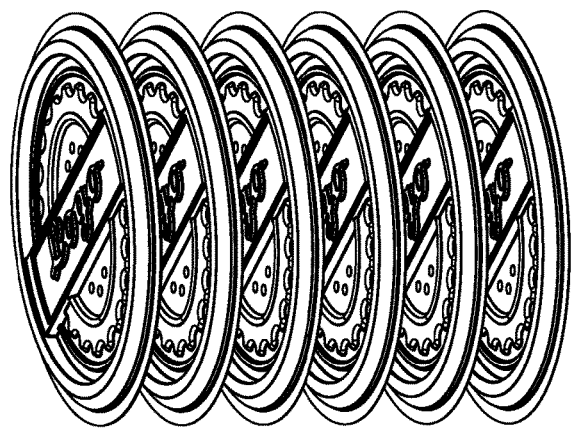

FIG. 4B illustrates how the 3-D sticker of FIG. 4A can stack and nest.

FIG. 4C illustrates a novel 3-D sticker.

FIG. 4D illustrates how the 3-D sticker of FIG. 4C can stack and nest.

Figure 5A:
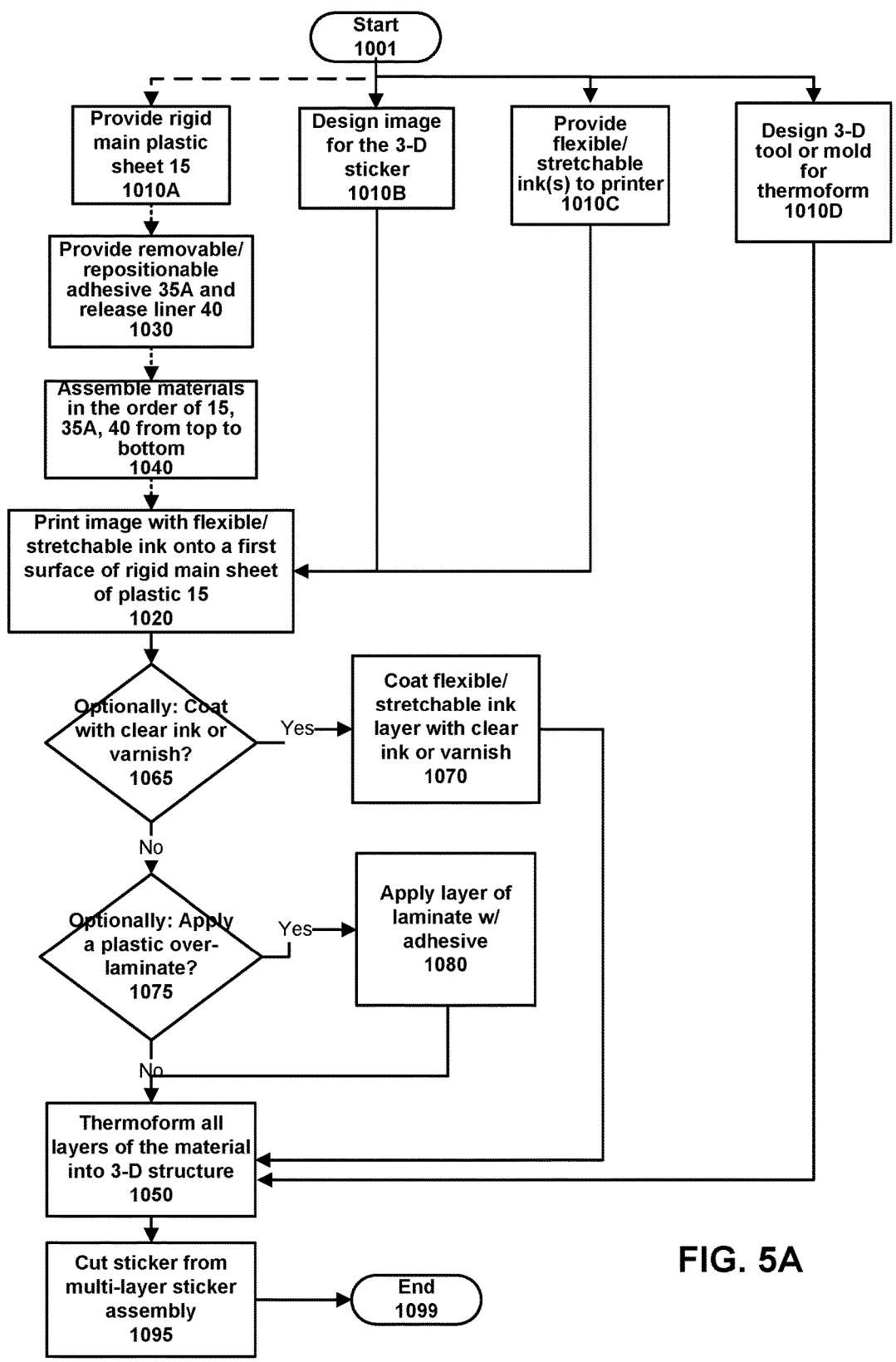

FIG. 5A is a flow chart illustrating the method of manufacture for a 3-D sticker according to the first embodiment.

Figure 5B:
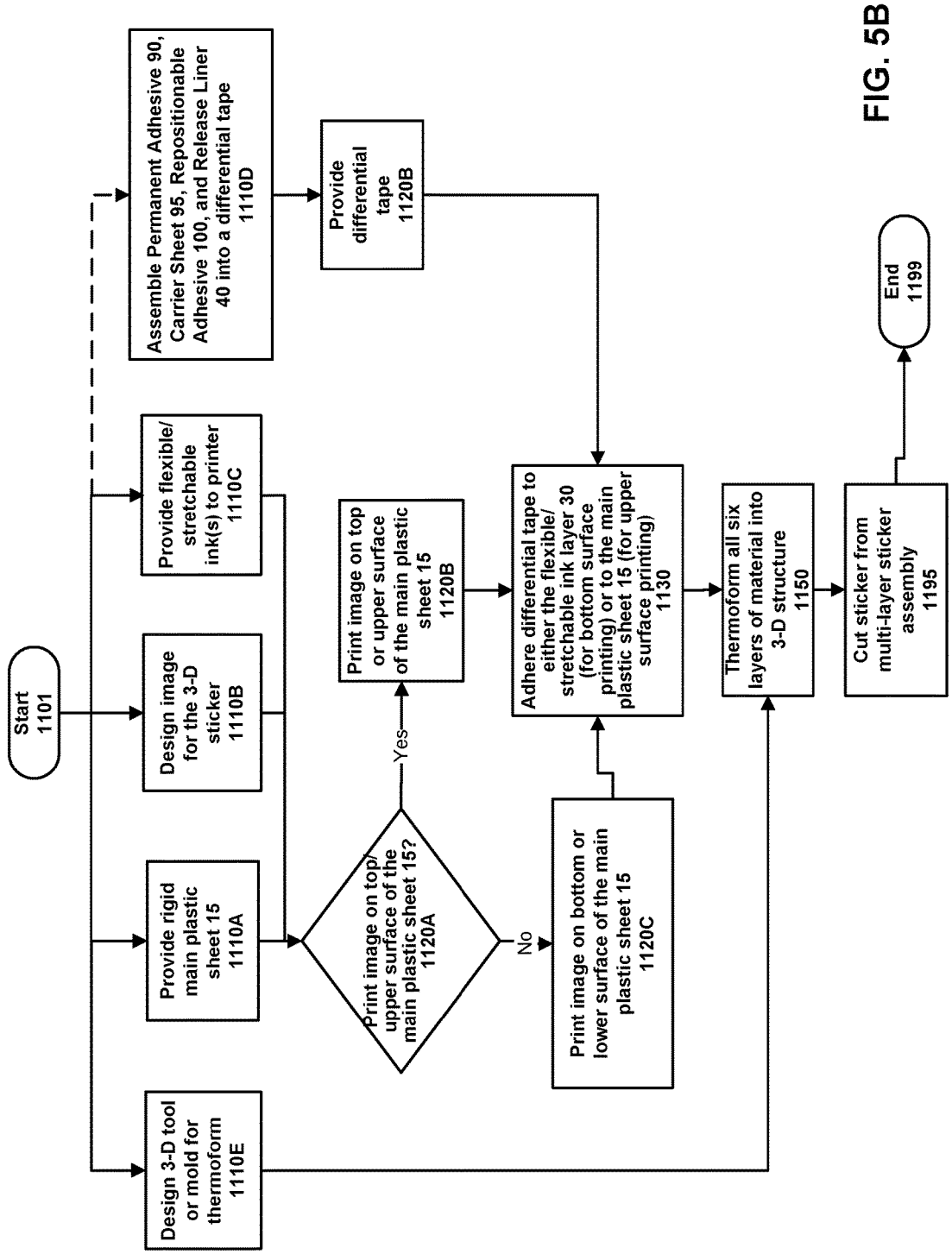

FIG. 5B is a flow chart illustrating the method of manufacture for a 3-D sticker according to the second embodiment.

Figure 5C:
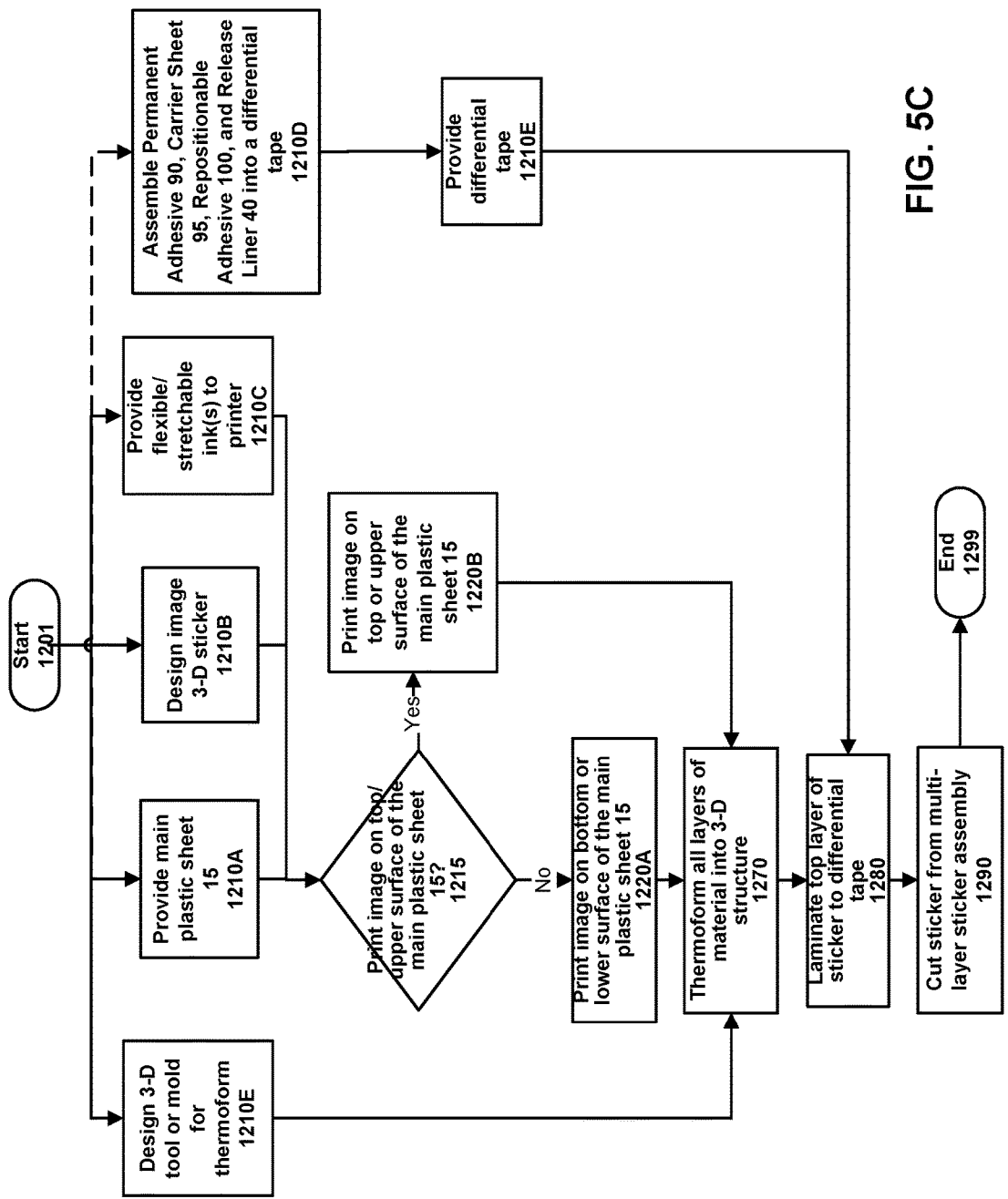

FIG. 5C is a flow chart illustrating the method of manufacture for a 3-D sticker according to the third embodiment.

Figure 6B:
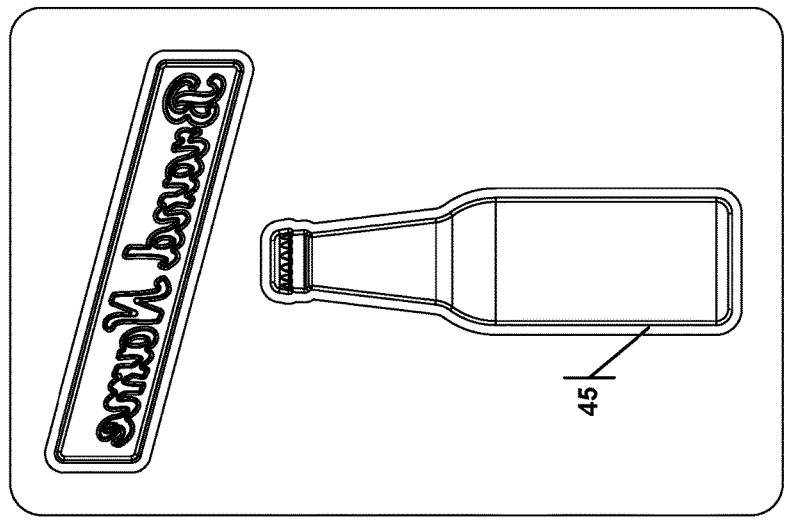
Figure 6A:
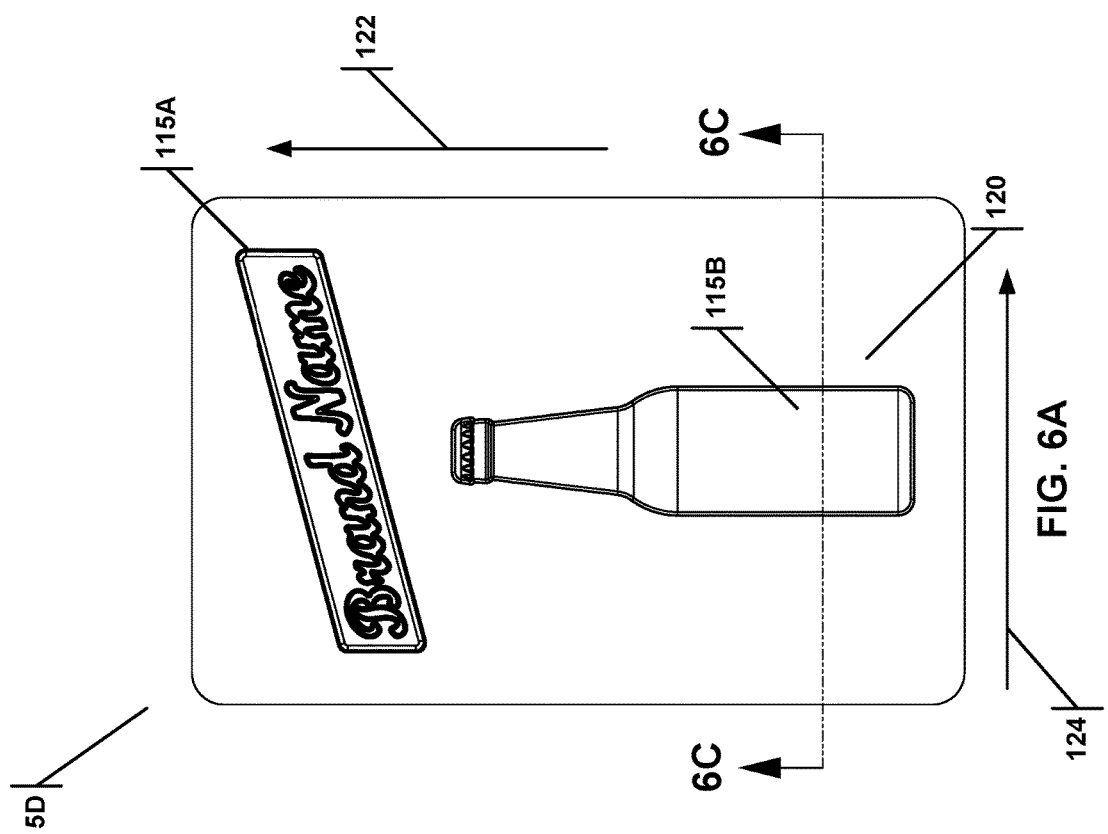

FIG. 6A is a top plan view of a fourth embodiment of a 3-D sticker, with a sectional line 6C-6C.

FIG. 6B is a bottom plan view of the further embodiment of the 3-D sticker.

FIG. 6C is an enlarged cross-sectional view across sectional line 6C-6C shown in FIG. 6A.

Figure 6D:
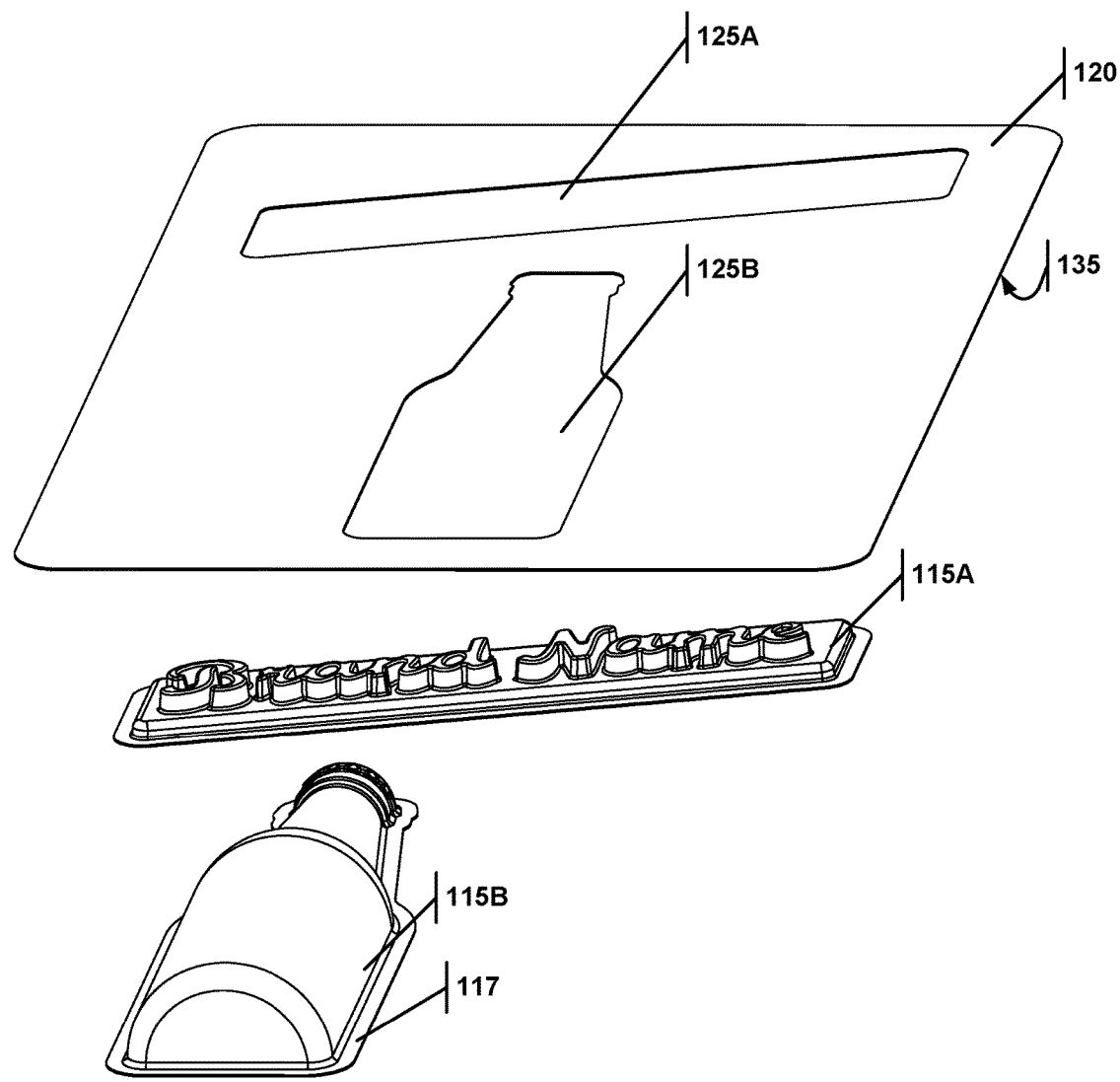

FIG. 6D is an exploded view of the fourth embodiment of the 3-D sticker.

Figure 6F:
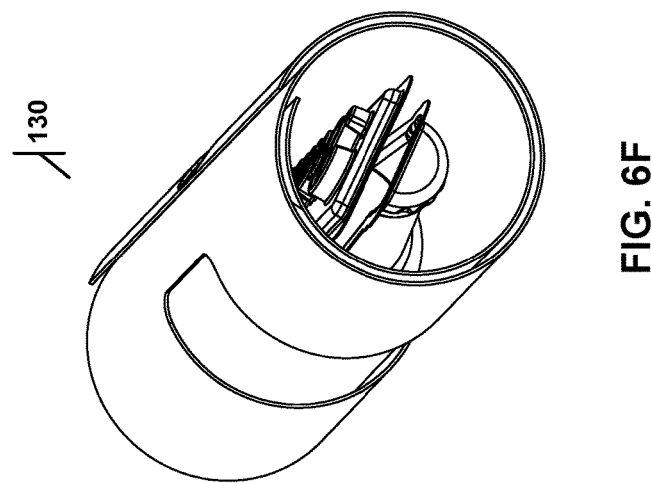
Figure 6E:
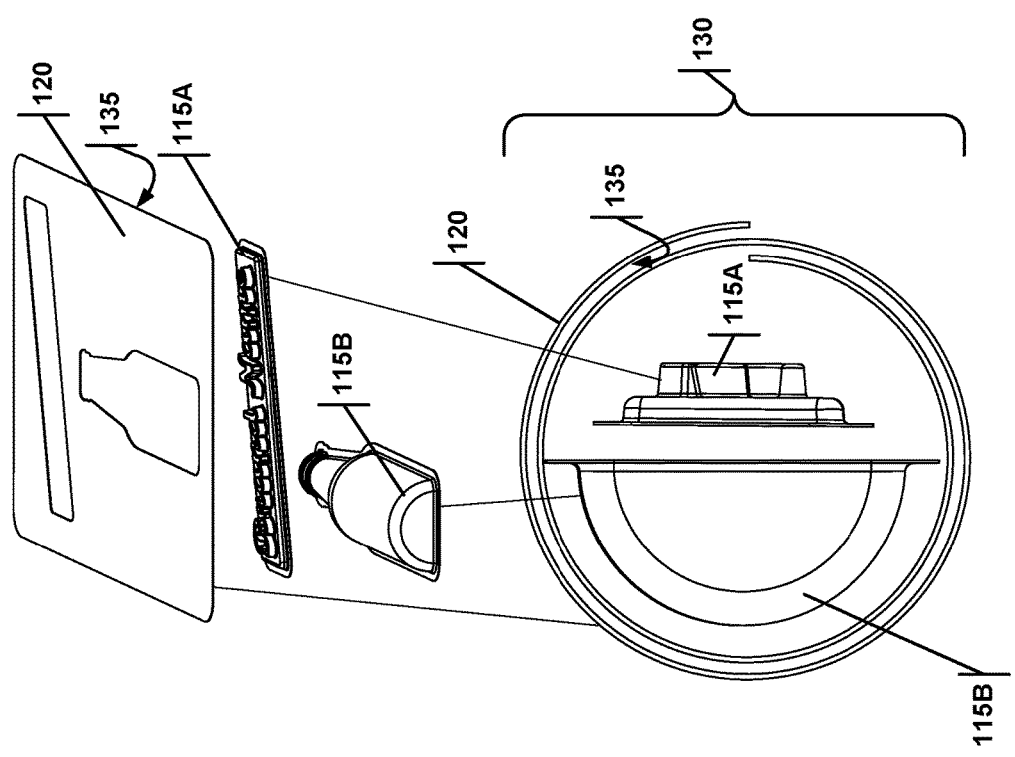

FIG. 6E illustrates how the fourth embodiment of the 3-D sticker can be configured for compact transportation.

FIG. 6F illustrates a perspective view of the fourth embodiment of the 3-D sticker in a compact transportation configuration.

FIG. 7A illustrates the first steps of a manufacturing method to create a 3-D sticker with a transport sheet.

FIG. 7B illustrates a continuation of manufacturing steps from FIG. 7A to create a 3-D sticker with a transport sheet.

FIG. 7C illustrates a continuation of manufacturing steps from FIG. 7A to create a 3-D sticker with a transport sheet that includes a light.

Figure 8:
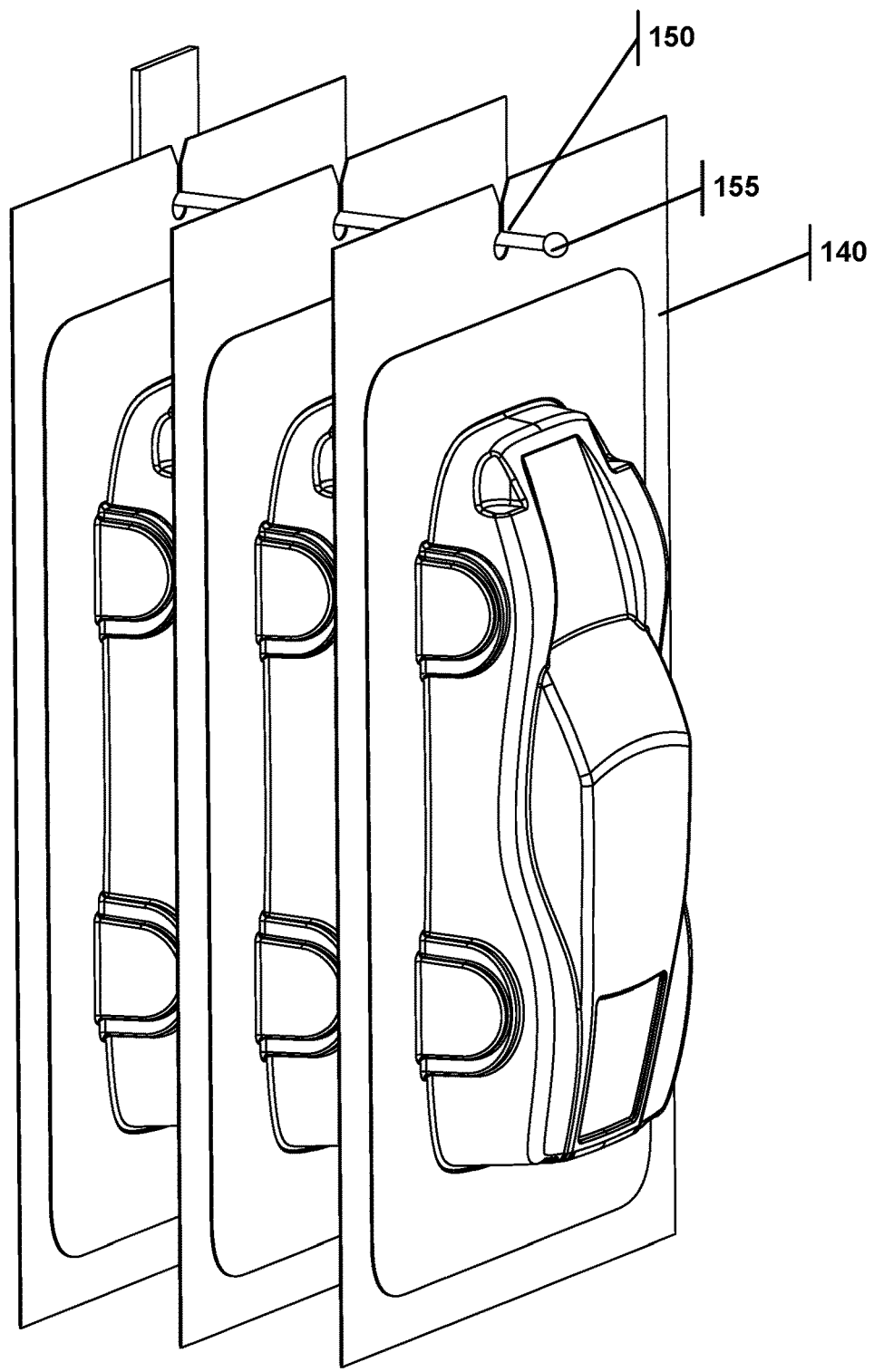

FIG. 8 illustrates the 3-D sticker with a transport sheet that contains an eyelet for a hanger post.

5.0 DETAILED DESCRIPTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with FIGS. 1A-8 and is provided for ease of reference, where like reference numerals designate corresponding features throughout the specification and figures:

3-D Sticker (First Embodiment) 5A
3-D Sticker (Second Embodiment) 5B
3-D Sticker (Third Embodiment) 5C
3-D Sticker (Fourth Embodiment) 5D
Body (First Embodiment) 10A
Body (Second Embodiment) 10B
Body (Third Embodiment) 10C
Rigid Main Sheet 15
Rigid Main Sheet First Side 20
Rigid Main Sheet Second Side 25
Flexible/stretchable Ink Layer 30
Adhesive Layer (First Embodiment) 35A
Adhesive Layer (Second Embodiment) 35B
Adhesive Layer (Third Embodiment) 35C
Release Liner 40
Anchor Region 45
Elevated Region 50
Anchor Plane 55
Clear Ink/Varnish 60
Plastic Over-Laminate 62
Laminate Adhesive layer 63
Light 65
Cavity 70
Light Power Source 75
Display Surface 78
Light Remote Control 80
Light Control Signal 82
Transparent Portion 85
First Adhesive Sub-Layer Second Embodiment (Permanent Adhesive) 90
Second Adhesive Sub-Layer Second Embodiment (Carrier Sheet) 95
Third Adhesive Sub-Layer Second Embodiment (Re-Positional Adhesive) 100
Anchor Region Circumscribing Outer Edge of Body 105
Air Pressure Supporting Elevated Portion 110
Separate 3-D Body 115A, 115B, 115C
Anchor Top Surface 117
Transition 118
Anchor Gasket Sheet 120
First Roll Up Direction 122

Second Roll Up Direction 124
3-D Body Complementary Cut-Out 125A, 125B, 125C
Transportable 3-D Sticker Configuration 130
Anchor Gasket Release Liner 135
Transport Sheet 140
Eyelet 150
Hanger Post 155

5.1 First Embodiment

Figure 1E:
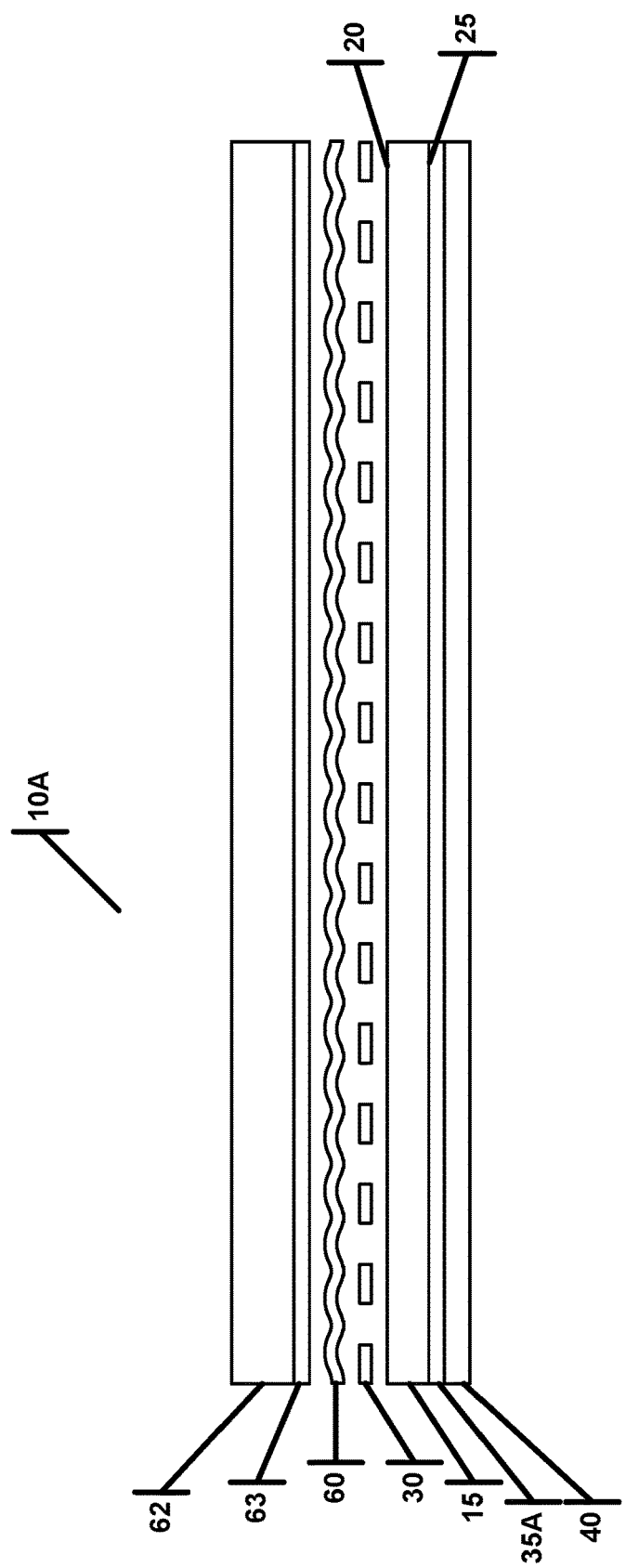
FIG. 1E is an enlarged cross-sectional view of the first embodiment of a 3-D sticker body.

In a first embodiment of the present invention, illustrated by FIGS. 1A-1K, a 3-D sticker 5A is primarily constructed of four layers of material, and may include a clear ink or varnish top coat layer or a plastic over-laminate layer. The 3-D sticker body 10A is comprised of a rigid main sheet 15, a flexible/stretchable ink layer 30, an adhesive layer 35A, and a release liner 40. All four layers (15, 30, 35A, 40) that comprise the body 10A of the first embodiment 3-D sticker 5A are thermoformed into a 3-D shape with an anchor region 45 and an elevated region 50. The four layers (15, 30, 35A, 40) of the 3-D sticker body 10A are represented in FIG. 1B, illustrated in an enlarged cross-sectional view in FIG. 1C, further represented in a enlarged cross-sectional view in FIG. 1D, and finally shown in yet more detail in FIG. 1E.

In FIG. 1E, an ink layer 30 lies on top of a first side 20 of a transparent or white rigid main sheet 15. The flexible/stretchable ink layer 30 forms an image, which may be a digital inkjet printed high-resolution image, that can be seen on the top of the sticker 5A. The ink layer 30 is flexible or stretchable so that it may be thermoformed into a three-dimensional shape along with the other layers of the 3-D sticker body 10A. The inks used for the flexible/stretchable ink layer 30 may be UV curable or LED curable colored inks that are used to articulate the high-resolution image of sticker 5A. Flexible/stretchable inks for digital inkjet printing are relatively new to the print industry, and thus, at the present time, they may only be procured from a handful of manufacturers such as Fujifilm, EFI, Mimaki, Roland, and SwissQprint. Although digital inkjet printing is the preferred method for producing the flexible/stretchable ink layer 30, other types of printing methods may be used to achieve a similar effect, including lithography, flexographic or Web, gravure, and silkscreen printing. An advantage of using digital inkjet printing for producing the 3-D sticker 5A is low set-up costs, which facilitate cost-effective low-volume manufacturing. The flexible/stretchable ink layer 30 may be distortion printed on the first side 20 of the rigid main sheet 15 to compensate for the image stretching during the thermoforming process. If the rigid main sheet 15 is clear, one or two layers of opaque white ink (part of ink layer 30) may be printed under the colored inks to enhance vibrancy.

The second layer of the sticker body 10A (moving top to bottom) is the rigid main sheet 15, which is constructed from a thin-gauge (10 mil-125 mil thick), rigid, thermoformable main body plastic film or sheet. The rigid main sheet 15 is selected to exhibit thermoform and stretch properties for the creation of the 3-D structure employed by sticker 5A. The rigid main sheet 15 material may be selected from several different types of thermoformable plastics such as PET, RPET, ABS, HIPS, PVC, HDPE, PETG, PP, and PMMA. This layer 15 of the sticker body 10A may be transparent or white and is an important layer of the four-layer sticker body 10A construction because it is substantially responsible for retaining the elevated structure that defines the 3-D sticker. The flexible/stretchable ink layer 30 adheres to the first side 20 of the main sheet 15, and the second side 25 of the rigid main sheet 15 adheres to the next layer, the adhesive layer 35A.

The adhesive layer 35A, which is the third layer of the first embodiment sticker body 10A, is formed by a layer of removable or repositionable adhesive for indoor or outdoor use. For embodiments of the present invention that are used in outdoor environments, the removable or repositionable adhesive 35A must be water-resistant or waterproof. The likely applications for indoor 3-D stickers 5A may include bedroom walls and store interiors. The likely applications for outdoor 3-D stickers 5A may include store windows, cars, action sports equipment, etc.

The fourth layer of the first embodiment sticker body 10A is a semi-rigid or rigid, thermoformable plastic release liner 40. Prior art applications associated with the printing industry, disclose sticker release liners that are constructed from paper so they cannot thermoform, stretch, or retain a 3-D shape. In contrast, the plastic release liner 40 used in the present invention, is not only thermoformable, but is designed to retain its thermoformed 3-D shape while being removed from the back side of the sticker 5A.

FIG. 1E also illustrates optional layers that may go on top of the flexible/stretchable ink layer 30 to help protect the integrity of the image. The flexible/stretchable ink layer 30 may be protected by a layer of clear ink or varnish 60, which adheres to the flexible/stretchable ink layer 30, or a plastic over-laminate layer 62. If a plastic over-laminate layer 62 is used, there is a laminate adhesive layer 63 that adheres to the ink layer 30. The optional protective layer(s) (60 or 62, 63) are transparent, to not impede the view of the image formed by the flexible/stretchable ink layer 30. The optional protective layer(s) (60 or 62, 63) may also provide the sticker 5A with a glossy or satin finish so that the top surface of the sticker may have a more aesthetically pleasing luster. When a transparent rigid main sheet 15 is utilized, there are some applications where semi-transparency of the colored image may be desired for a portion or portions of the 3-D sticker 5A, in these instances the opaque white ink layer(s) may be omitted.

What makes the construction of sticker 5A novel and unique from the prior art is that each component or layer of the sticker body 10A is carefully selected to exhibit thermoform and stretch properties. Additionally, all layers must perform well when exposed to heat, and retain their shape after they have been thermoformed into a rigid shape. The careful selection of materials for each component or layer ensures that each layer exhibits thermoform and stretch properties which enables all four layers to be thermoformed together at the same time. Thermoforming all of the layers together is advantageous for high-volume manufacturing.

Figure 1F:
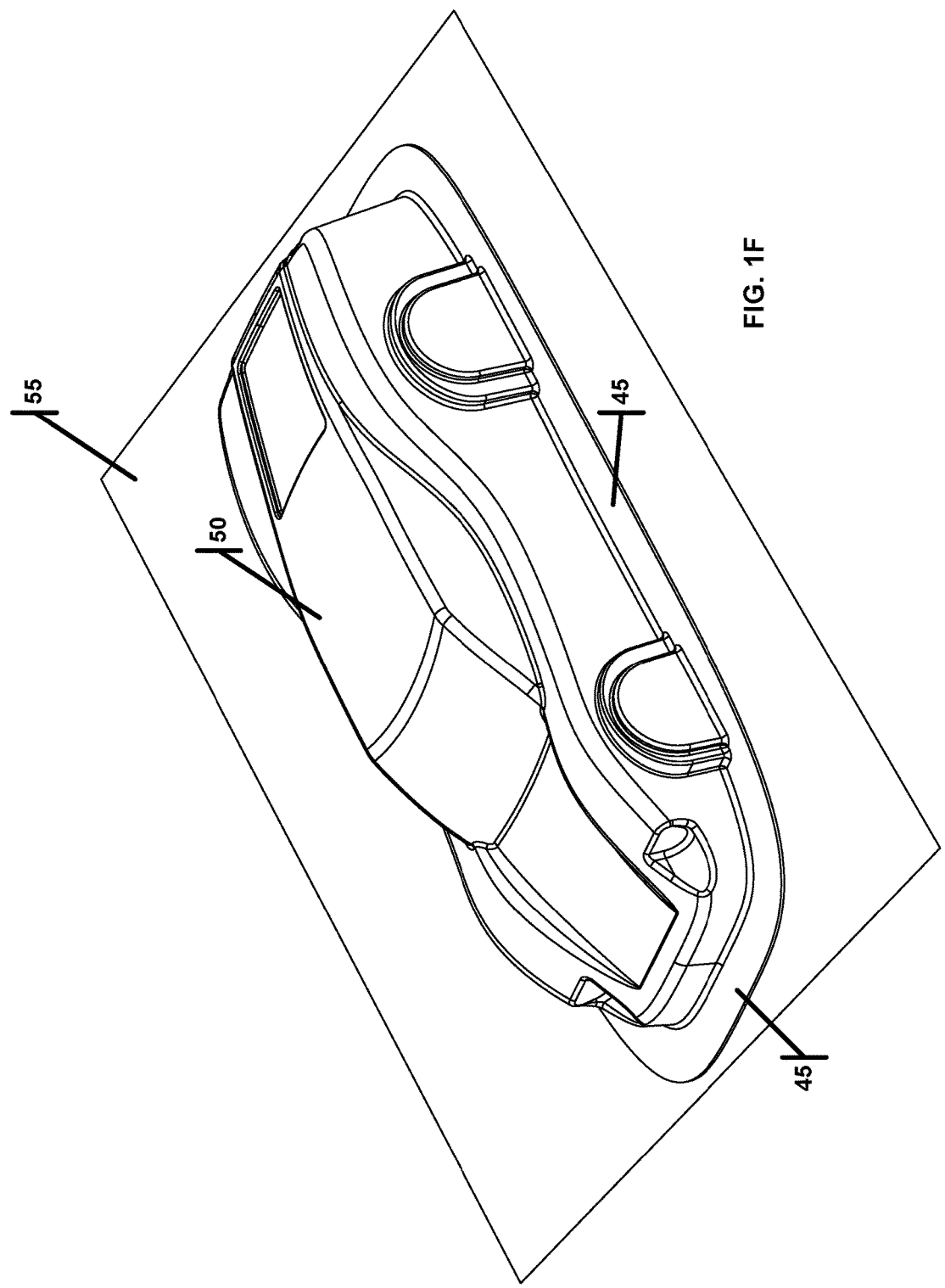
FIG. 1F is a top isometric view of the first embodiment of a 3-D sticker illustrating the anchor region, elevated region and the anchor plane.
Figure 1G:
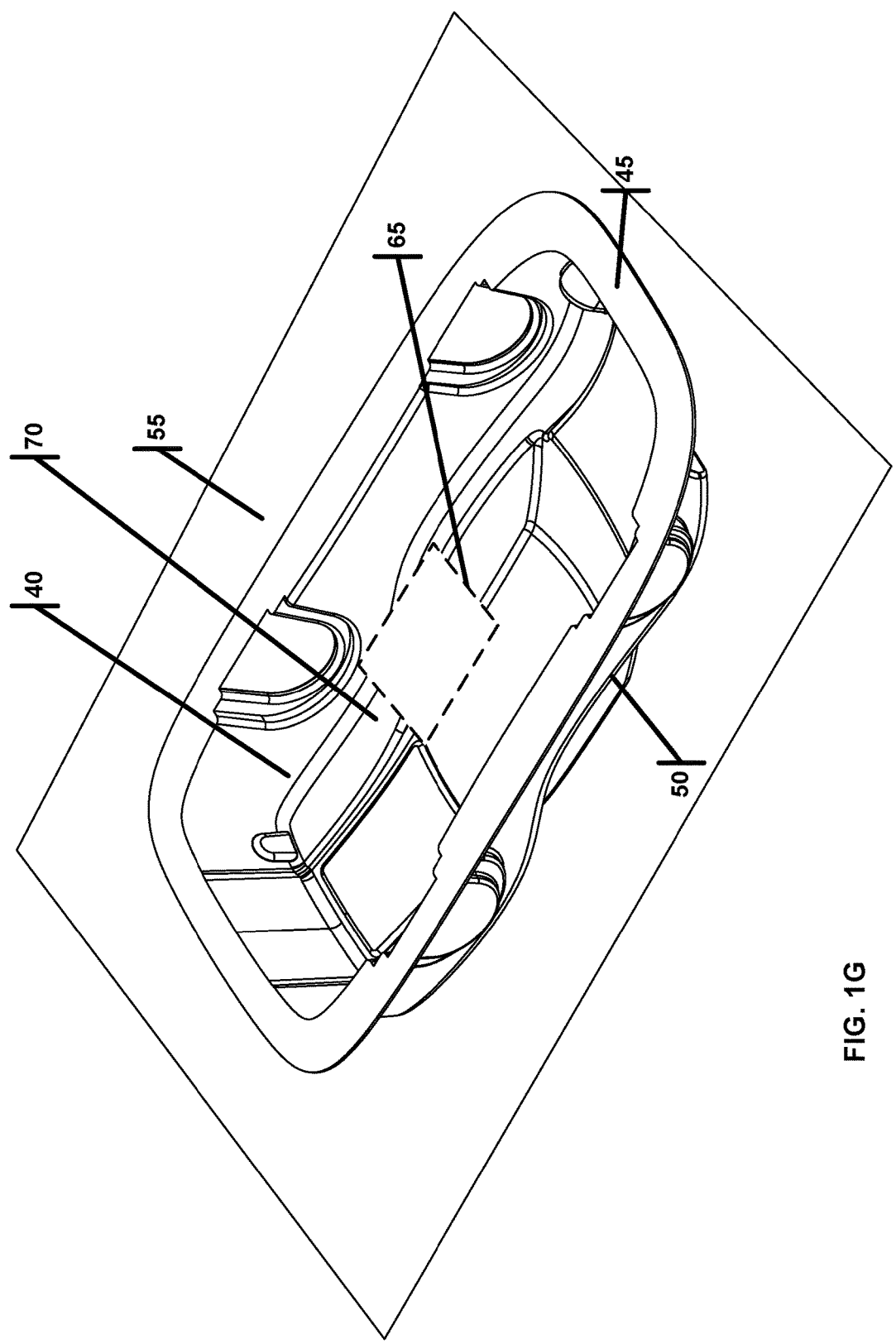
FIG. 1G is a bottom isometric view of the first embodiment of the 3-D sticker illustrating the anchor region, elevated region, the anchor plane and a light disposed of in the cavity.

FIGS. 1F and 1G illustrate an example of the first embodiment sticker 5A after thermoforming, from top (1F) and bottom (1G) isometric directions. The sticker body 10A, after thermoforming into a 3-D shape, exhibits an anchor region 45, that features a lip around the outside edge of the elevated thermoformed structure. The underside of the lip that is associated with the anchor region 45 and the entire bottom surface of the sticker 5A employ a removable or repositionable adhesive. The anchor region 45 allows the sticker 5A to adhere to flat or semi-flat surfaces such as a glass windshield, store window, or a wall. The anchor region 45 of the sticker 5A is substantially planar so that it defines an anchor plane 55, and the protruding 3-D shape or structure of the sticker 5A comprises an elevated region 50 that extends away from the anchor plane 55. It should be noted that both the anchor region 45 and the elevated region 50 are formed with the same four-layer sticker body 10A that contains both the adhesive 35A and the release liner 40. As previously mentioned, both the adhesive layer 35A and the release liner 40 are present in the anchor region 45 and in the elevated region 50.

A cavity 70 is formed by the sticker body 10A above the anchor plane 55 and under the elevated region 50. Objects, such as a light 65, may be placed inside the cavity 70. When a light 65 is placed inside the cavity 70, the light is pre-applied or fastened to the application site or display surface 78, by first removing the release liner from the sticker, whereupon the sticker is lifted and positioned over the light 65, and the anchor region 45 is adhered to the application site or display surface 78. Illuminating the elevated region 50 may be useful, for example, when the 3-D sticker 5A is applied as a logo or sign to the outside of a store window, and it is desired to light up the logo or sign.

Provided in FIG. 1H is a light 65 positioned within the cavity 70, i.e. on the anchor plane, where the light assembly resides substantially in-between the anchor plane 55 and the elevated region 50 of the sticker 5A. The light 65 may be powered by a self-contained power source 75, such as a battery, and may employ a remote control 80 that transmits a wireless signal. The light control signal 82 may additionally be an infrared signal, transmittable through a transparent portion 85 of the elevated region 50. The infrared light signal 82 therefore can travel through the transparent portion 85 of the sticker body 10A to reach the light 65, triggering the light 65 to turn on, which can then illuminate the 3-D sticker 5A from within. This may be useful in an application where the sticker 5A is used as a store logo or sign. The remote control 80 may turn the light off and on, dim the light 65, change the light color, and may have settings that control how long the light 65 stays illuminated. The remote may be configured as an app on a cell phone.

By removing the sticker 5A from the display surface 78, the light 65 can be accessed to have its power source replaced. Additionally at any time the light 65 may be accessed or repositioned along with the sticker 5A when it is desired to do so. Furthermore, in an outdoor application, the sticker 5A may employ a waterproof removable adhesive that secures the elevated region 50 of the sticker, via the anchor region 45, to the display surface 78. A waterproof cavity 70 can protect the light 65 contained within from extreme environments and enable the light 65 to be operated safely in a range of weather conditions.

There are a number of differences that exist between the present invention and the prior art. First, unlike the prior art the rigid main sheet 15 of the sticker 5A is rigid and not flexible, enabling the sticker to retain its shape in extreme environments such as a car wash, or in action sports environments where the sticker 5A may, for example, be applied to the nose of a surfboard or snowboard. Second, as described in the third embodiment, an air tight cavity is formed between the elevated region 50 and the anchor plane 55 that strengthens the elevated region 50 and prevents the 3-D sticker 5A from denting while being utilized in extreme environments or being crushed while the sticker is being shipped to a desired location. Third, unlike prior art, in the first and second embodiments, the release liner 40 for the sticker 5A is applied to the entire bottom of the sticker, including the three-dimensional structures, which makes it easy to remove. Furthermore, because the main sheet 15 is rigid, when the release liner 40 is pulled off, the three-dimensional structure of the sticker 5A does not cave inward or deform. Finally, because layer 35 is repositionable, the sticker can be repositioned and/or reused. This is useful, for instance, when replacing the battery 75 in light 65, that may be positioned inside the sticker cavity 70.

Figure 1J:
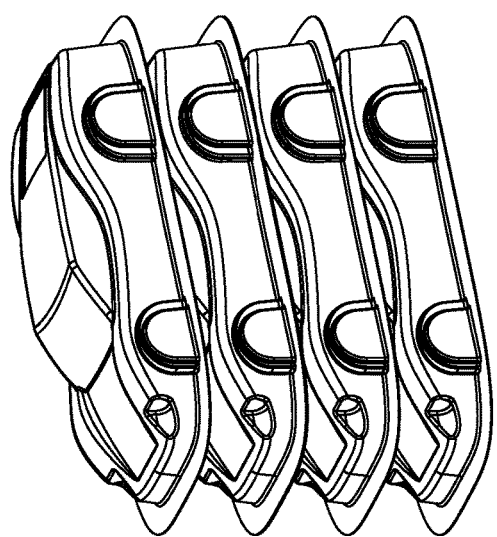
FIG. 1J illustrates an isometric view of 3-D stickers according to the first embodiment nesting into each other.
Figure 1K:
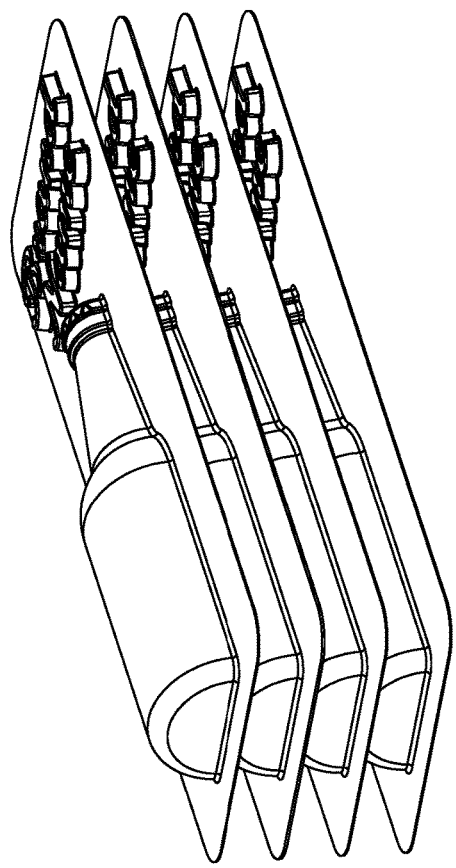
FIG. 1K illustrates an isometric view of 3-D stickers according to the first embodiment nesting into each other.
Figure 1I:
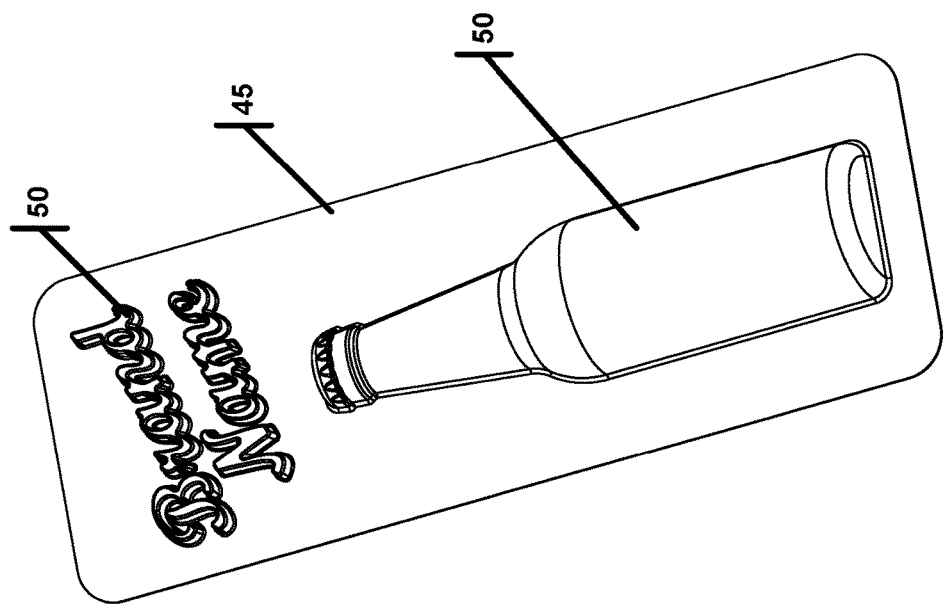
FIG. 1I illustrates an isometric view of a 3-D sticker according to the first embodiment.

FIG. 1I provides an isometric view of a sticker 5A constructed in accordance with the first embodiment, where there is more than 1 elevated region 50 protruding away from the anchor region 45 and the anchor plane 55. FIGS. 1J and 1K show that the stickers may be stacked or nested on top of one another after thermoforming.

Referring now to FIG. 5A, the present invention also discloses a method of manufacture for the first embodiment 3-D sticker 5A.

At the start 1001 of the sticker construction process, any one of three steps 1010A, 1010B, or 1010C may be undertaken first. The order in which each step is completed, relative to the other two, does not matter as long as all steps 1010A, 1010B, and 1010C are completed prior to the next step, 1020.

In step 1010A, a main body plastic film or sheet 15 is provided, preferably a thin-gauge (10 mil-125 mil) rigid, and thermoformable plastic layer, which can be transparent or white, and is designed to retain its three-dimensional shape after thermoforming. In step 1030, the removable/repositionable adhesive 35A and the release liner 40 are provided. The removable/repositionable adhesive 35A may be water resistant or waterproof, and in conjunction with the release liner 40 allows the sticker 5A to be repositioned and/or removed, if so desired. After the adhesive 35A and the release liner 40 are provided, the next step 1040 in the sticker construction process is to assemble the three layers in order, as provided by the step 1040 in FIG. 5A. The dotted line from the start of the process 1001 to the step 1010A, and through step 1040, indicates that steps 1010A through 1040 may or may not be steps that are taken at the sticker manufacturing facility. The implication is that perhaps, the sticker manufacturer can purchase the rigid main plastic sheet 15 with the repositionable adhesive 35, and release liner 40, pre-attached in a ready-made format, without assembly at the facility.

In step 1010B, the image on the top surface of the 3-D sticker 5A is to be designed with the aid of tools such as CAD software programs. In step 1010C, a plurality of flexible/stretchable inks is provided to the sticker printer. These inks may be UV or LED curable, and colored or white, so long as they are flexible/stretchable. In step 1010D, the tooling or molds needed for the desired 3-D structure are designed, and will be used in the thermoform step 1050.

If the materials needed for printing are ready (steps 1010A, 1010B, 1010C. 1030, 1040 are complete), the next step 1020 is to print the sticker image using the flexible/stretchable ink 30 onto a first surface of the rigid sheet 15. This can involve a range of printing techniques, including distortion printing. The image is preferably printed via methods that employ digital inkjet technology.

Prior to thermoforming, there may be optional steps. It may be useful to decide whether to coat the top layer of the sticker, the flexible/stretchable ink layer 30, with a clear ink or varnish (step 1065). If the decision is yes, the process can take the optional step of 1070, where clear ink or varnish is applied over the flexible/stretchable ink, and then all the layers are thermoformed in step 1050. Alternatively, it can be decided whether to coat the top layer of the sticker with a plastic over-laminate; if yes, then the optional steps of 1080 may be taken, so that the sticker body 10A would also have a layer of plastic over-laminate 62 that includes adhesive layer 62, wherein all the layers are thermoformed in step 1050.

If the decision is no for both steps 1065 and 1075, the sticker construction proceeds to step 1050, where all the layers are thermoformed into a 3-D structure. After all the sticker body layers are thermoformed (step 1050), the sticker body 10A comprises an anchor region 45 substantially in the anchor plane 55, and an elevated region 50 substantially not in the anchor plane 55.

The sticker 5A may then be cut from the multi-layer thermoformed sticker assembly, as shown in step 1095. The sticker 5A can be cut from the assembly using either a steel rule die, laser method, digital method, or other suitable cutting means. They may be cut from the assembly, for example, on a Zund Swiss digital cutting machine. After step 1095, the sticker construction process is ended.

Also, unlike the prior art, the sticker will retain its shape while the release liner 40 is being removed, and additionally, the 3-D structure remains intact while removing and/or repositioning the sticker.

5.2 Second Embodiment

The present invention also provides a second embodiment and third embodiment that are constructed using six layers for the sticker body 10B, 10C instead of four layers as utilized for sticker body 10A of the first embodiment sticker 5A. Whereas a four-layer construction is preferred for high volume manufacturing because it is simpler and may use less material, it requires custom converted components that must be ordered in high volume to be cost effective. More specifically, a four-layer construction requires a custom manufacturer or converter to directly apply a removable adhesive 35A and release liner 40 to the rigid thermoformable main body film or sheet 15, which may be cost prohibitive for low volume production. A six-layer construction, which requires no custom components, is better suited for low-volume manufacturing and is disclosed in conjunction with the second and third embodiments of the sticker 5B, 5C.

Figure 2G:
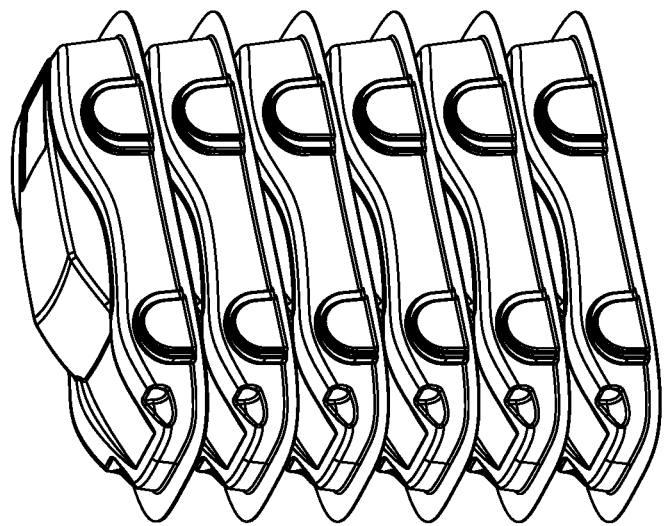
FIG. 2G illustrates an isometric view of 3-D stickers according to the second embodiment nesting into each other.
Figure 2F:
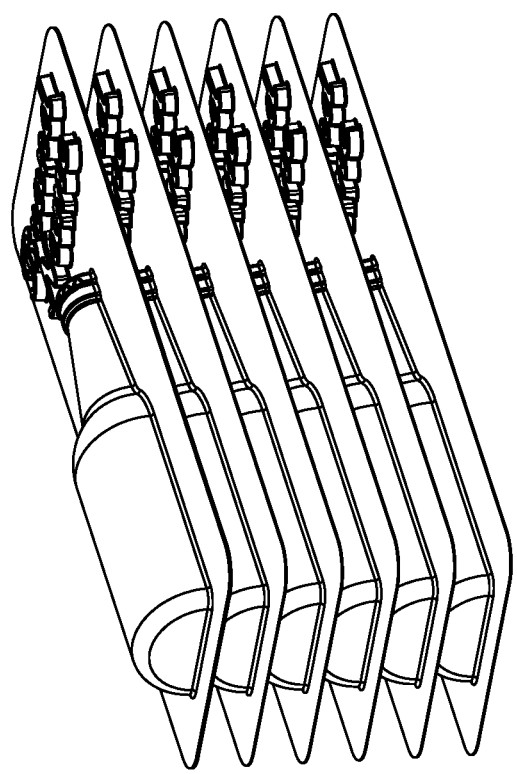
FIG. 2F illustrates an isometric view of 3-D stickers according to the second embodiment nesting into each other.

In the second embodiment of the present invention, illustrated in FIGS. 2A-2G, a 3-D sticker 5B is constructed of six layers of material in its body 10B. From the top layer to the bottom layer of the sticker body 10B, the layers are: the rigid main sheet 15, the flexible/stretchable ink layer 30 (which may alternatively be applied to the top surface of the rigid main sheet 15), three adhesive layer sublayers 90, 95, 100 that together comprise an adhesive layer 35B, and the release liner 40. The six layers (15, 30, 90, 95, 100, 40) of the 3-D sticker body 10B are represented in FIG. 2B, illustrated in an enlarged cross-sectional view in FIG. 2C, are further represented in an enlarged cross-sectional view in FIG. 2D, and finally are shown in the most detail in FIG. 2E. FIGS. 2F and 2G show, that like stickers 5A of the first embodiment, stickers 5B of the second embodiment can also be nested or stacked on top of one another.

A salient difference between the first and second embodiments, as discernible between FIGS. 1E and 2E, is that in the second embodiment the flexible/stretchable ink layer 30 may lie between the rigid main sheet 15 and the adhesive layer 35B. Although in the second embodiment, it is preferred that the ink layer 30 lie between the rigid main sheet 15 and the adhesive layer 35B, the ink layer 30 may also be printed on the first side 20 of the rigid main sheet 15.

In the second embodiment, the rigid main sheet 15 is preferably comprised of a transparent thin-gauge (10 mil-125 mil), rigid, thermoformable main body plastic film or sheet. Because the rigid main sheet 15 is the top layer, and because inks may be printed on the back side of this layer, it may act as a protective barrier for the flexible/stretchable ink layer 30. The high-resolution image formed by the flexible/stretchable ink layer 30 may be viewed through the transparent rigid main sheet 15. The rigid main sheet 15 may add a gloss or satin finish over the top surface of the sticker 5B. By adding a gloss or satin finish to the assembled sticker body 10B, the aesthetic appeal of the sticker 5B may be improved. If the inks are printed on the first side 20 of the main rigid sheet 15, the main sheet 15 may be white similar to the first embodiment.

The preferred second layer of the second embodiment sticker body 10B is the flexible/stretchable ink layer 30. This ink layer 30 may be formed by UV or LED curable, flexible/stretchable colored and opaque white inks. As discussed in conjunction with the first embodiment, a wide range of printing methods/techniques may be used without departing from the scope or spirit of the invention. Preferably (but not necessarily), the high-resolution colored image is distortion printed in reverse on the back side or the lower surface of a transparent, rigid thermoformable main body plastic film or sheet 15, and then one or more layers of opaque white ink are printed behind the colored inks to create a more vibrant image that is less transparent. If semi-transparency is a desired component of the sticker construction, then the opaque white layer(s) may be omitted from the finally assembly. Metallic, reflective, or iridescent inks may be employed to create a more dynamic image. The flexible/stretchable ink layer 30 adheres to the main sheet 15.

Below the second layer 30, the adhesive layer 35B consists of three sub-layers: a permanent adhesive layer 90, a plastic carrier sheet 95, and a removable or repositionable adhesive layer 100. The first adhesive sub-layer, the permanent adhesive 90, adheres to the lower surface of the flexible/stretchable ink layer 30. The second adhesive sub-layer, the plastic carrier sheet 95, adheres to the lower surface of the permanent adhesive 90, and the third adhesive sub-layer, the repositionable adhesive 100, adheres to the lower surface of the plastic carrier sheet 95 and to the top surface of a release liner 40. The release liner 40 is the last layer in the six-layer construction of sticker body 10B of the second embodiment sticker 5B.

The permanent adhesive 90 and the removable or repositionable adhesive 100 must be able to retain their adhesive properties while being exposed to heat during the thermoforming process. Although thermoforming temperatures depend on the plastic sheet thickness and the type of plastic to be thermoformed, the adhesives in the preferred embodiments must be able to withstand temperatures as high as 190 degrees Celsius (374 Fahrenheit). The carrier sheet 95 that is the fourth layer of the second embodiment sticker body 10B is constructed from a thermoformable plastic film or sheet, and may be transparent or white, depending on the application. The carrier sheet 95 employs the permanent adhesive 90 on one side and a removable or repositionable adhesive 100 on its other side. In outdoor applications, the permanent adhesive 90, and removable or repositionable adhesive 100, should be water resistant or waterproof. Since the 3-D sticker 5B may be used for promotional advertising, and it may be difficult to predict all of the locations (such as restaurants, amusement parks, sports venues, airports, stores, etc.) where the stickers may be applied, it may be preferable to always employ a waterproof adhesive for layers 90 and 100.

The sixth and bottommost layer of the second preferred embodiment is a rigid or semi-rigid, thermoformable plastic release liner 40, which may be transparent, white, or another color, depending on the type of aesthetic appeal that is desired for the final sticker assembly. The release liner 40 must be thick enough to thermoform without thin zones occurring during the thermoforming process; if thin zones are formed during the molding process, the release liner 40 will tear while being removed from the back side of the sticker 5B. The release liner 40 is designed to retain its three-dimensional shape while being removed from the back side of the sticker 5B, and it should additionally retain its shape after being completely removed. A release liner 40 that retains its shape during and after removal is a novel construction that has not been previously demonstrated or contemplated in prior art.

As with the first embodiment of the present invention, the second embodiment also features the entire body 10B thermoformed into a 3-D shape with an anchor region 45 and an elevated region 50 that protrudes upward from the anchor plane 55 (i.e., outside of the anchor plane 55). Both the adhesive layer 35B and the release liner 40 are present in the anchor region 45 and in the elevated region 55. In one example of the prior art previously discussed, the adhesive is applied only to the flat anchor region, and the main body film or sheet is flexible, so even if the bottle label had a release liner (which it does not), it would be unlikely to retain its 3-D structure while the release liner is being removed from the sticker body (i.e., while removing the release liner the pulling tension which is exerted by the end user may cave in or deform the flexible 3-D structure). There is no evidence that prior art contemplated having a repositionable 3-D sticker, and even if contemplated, it appears that prior art disclosures would not be able to retain their 3-D shape after being removed one or more times from a display surface 78.

Thus, the present invention is different from the prior art (i.e., a flexible bottle label) in that it is a rigid high performing repositionable sticker that is specifically engineered for indoor or outdoor extreme environments, and may additionally be illuminated by a light 65 that is sealed within a waterproof cavity 70, via anchor region 45 that employs a waterproof removable adhesive as part of the sticker body construction 10A or 10B.

As with the first embodiment, the second embodiment could feature a light 65 positioned on the anchor plane where the light assembly resides substantially in-between the anchor plane 55 and the elevated region 50, which forms cavity 70 just like in FIG. 1H. When a light 65 is placed inside the cavity 70, the light is pre-applied or fastened to the application site or display surface 78, then the release liner is removed from the 3-D sticker 5A or 5B, and the sticker is lifted and positioned over the light 65, and the anchor region 45 is adhered to the application site or display surface 78. A waterproof seal protecting the light 65 may be achieved via the anchor region 45. The light 65 may also come with a self-contained power source 75 such as one or more batteries and may employ a wireless remote control 80. For example, the light remote control 80 may transmit an infrared light signal 82, which may travel through a transparent portion 85 in the elevated region 50 to allow the infrared light signal 82 to reach the light 65 inside the cavity 70.

A method of manufacture for the second embodiment of the present invention is presented in FIG. 5B. After the sticker construction process begins (1101), the steps of obtaining the design and materials for printing are the same in 1110A, 1110B, and 1110C compared to 1010A, 1010B, and 1010C presented in FIG. 5A. Likewise in step 1110E, the tooling or molds needed for the desired 3-D structure are designed, and will be used in the thermoform step 1150.

In the second embodiment, the third through sixth layers may be available as differential tape. The dotted line from the start of the process 1101 to the step 1110D, where the differential tape is assembled, indicates that step 1110D may or may not be a step taken at the sticker manufacturing facility. The implication is that perhaps the sticker manufacturer can purchase the differential tape in a ready-made format, as in step 1120B, without assembling the differential tape (third through sixth layers 90, 95, 100, 40) at the facility. If the materials needed for printing are ready (steps 1110A, 1110B, 1110C are complete), the next step is to print the sticker image using flexible/stretchable ink 30 onto a surface of the rigid sheet 15. At steps 1120A-1120B a decision is made to either print on the top/upper surface of the main sheet 15 or print on the lower surface. If the inks are printed on the top/upper surface of the main rigid sheet 15, the main sheet 15 may be white.

Following the printing of the image onto a surface of the rigid sheet 15 (step 1120b or 1120C), which may involve distortion printing and other techniques, and following the step 1120B of providing a differential tape, the differential tape can be adhered to either the flexible/stretchable ink layer 30 (for bottom surface printing) or to the main plastic sheet 15 (for upper surface printing) (step 1130). After the six layers of the second embodiment are combined through the step 1130, they can then be thermoformed (step 1150) as provided by the tooling or mold from step 1110E. All six layers of material are present in the 3-D structure—i.e., the adhesive (consisting of sub-layers 90, 95, 100) and the release liner 40 are present both in an anchor region 45 and in the elevated region 50 after step 1150. Also, unlike the prior art, the sticker will retain its shape while the release liner 40 is being removed, and additionally, the 3-D structure remains intact while removing and/or repositioning the sticker. After the second embodiment sticker body 10B has been thermoformed (step 1150), the next step is, like step 1099 in FIG. 5A for sticker 5A, cutting the sticker 5B from the multi-layer sticker assembly, step 1195, before the sticker construction for the second embodiment is concluded in step 1199.

5.3 Third Embodiment

In the third embodiment, illustrated in FIGS. 3A-3H, a 3-D sticker 5C is constructed of six layers of material in its body 10C, just as in the second embodiment. From the top layer to the bottom layer of the sticker body 10C, the layers are: the rigid main sheet 15, the flexible/stretchable ink layer 30 (these two layers can be inverted as discussed below), three adhesive layer sublayers 90, 95, 100 that together comprise an adhesive layer 35C, and the release liner 40. The six layers (15, 30, 90, 95, 100, 40) of the 3-D sticker body 10C are represented in FIG. 3B, illustrated in an enlarged cross-sectional view in FIG. 3C, and further represented in an enlarged cross-sectional view in FIG. 3D.

A salient difference between the first and second embodiments on the one hand, and the third embodiment on the other hand, is that in the first and second embodiments the adhesive layers 35A and 35B are adhered in all regions of the 3-D sticker 5A, and 3-D sticker 5B, so that the adhesive layers 35A, 35B and the release liner 40 are present in the anchor region 45, and elevated region 50, whereas in the third embodiment, the adhesive layer 35C and the release liner 40 are substantially co-planar with the anchor plane 55, and do not conform to the underside of the 3-D structure that forms sticker 5C (see FIGS. 1E, 2E and 3E).

In the third embodiment the top layer is the rigid main sheet 15, which is preferably comprised of a thin-gauge (10 mil-125 mil), clear, thermoformable main body plastic film or sheet. Because the main sheet 15 may be the top layer, and because inks may be printed on the back side or the lower surface, it may act as a protective barrier for the flexible/stretchable ink layer 30 beneath it. Thus, the high-resolution image formed by the flexible/stretchable ink layer 30 may be viewed through the main sheet 15, which may be transparent. The main sheet 15 may also add a gloss or satin finish over the top surface of the sticker 5C. By adding a gloss or satin finish to the assembled sticker body 10C, the aesthetic appeal of the sticker 5C may be improved. The ink layer 30 may also be printed on the top surface of a white rigid main sheet 15.

The preferred second layer of the third embodiment sticker body 10C is the flexible/stretchable ink layer 30. This ink layer 30 may be formed by UV or LED curable, flexible/stretchable colored and opaque white inks. As discussed in conjunction with the first embodiment, a wide range of printing methods/techniques may be used without departing from the scope or spirit of the invention. Preferably (but not necessarily), the high-resolution colored image is first distortion printed in reverse on the back side or the lower surface of a transparent, rigid, thermoformable main body plastic film or sheet 15, and then one or more layers of opaque white ink are printed behind the colored inks to create a more vibrant image that is less transparent. If semi-transparency is a desired component of the sticker construction, then the opaque white layer(s) may be omitted from the finally assembly. Metallic, reflective or iridescent inks may be employed to create a more dynamic image. The flexible/stretchable ink layer 30 adheres to the main sheet 15, in sticker body 10C.

Below the second layer 30, the adhesive layer 35C consists of three sub-layers: a permanent adhesive layer 90, a plastic carrier sheet 95, and a removable or repositionable adhesive layer 100. The first adhesive sub-layer, the permanent adhesive 90, adheres to the lower surface of the flexible/stretchable ink layer 30. The second adhesive sub-layer, the plastic carrier sheet 95, adheres to the lower surface of the permanent adhesive 90, and the third adhesive sub-layer, the repositionable adhesive 100, adheres to the lower surface of the plastic carrier sheet 95 and to the top surface of a release liner 40. The release liner 40 is the last layer in the six-layer construction of sticker body 10C of the third embodiment sticker 5C. After the thermoforming process is complete, the permanent adhesive 90 adheres the elevated region 50 to the lower substantially planar layers of sticker body 10C via anchor region 45, and forms an airtight cavity 70 between these respective layers. The airtight cavity 70 is constructed to exert air pressure on the elevated portion 50, so as to help maintain the 3-D thermoformed shape of the sticker body 10C, shown as 110 in FIG. 3E. FIG. 3EE is an enlarged section of the adhesive layer 35C and the release liner 40 that attaches to the ink layer on the lower surface area of the anchor region 45 to form the airtight cavity 70.

The carrier sheet 95, that is the fourth layer of the third embodiment sticker body 10C, is constructed from a thermoformable plastic film or sheet, and may be transparent or white, depending on the application. The plastic carrier sheet 95 employs the permanent adhesive 90 on one side and a removable or repositionable adhesive 100 on its other side. The release liner 40 is detachably adhered to the third adhesive sub-layer 100. In outdoor applications, the permanent adhesive 90, and the removable or repositionable adhesive 100, should be water resistant or waterproof. Since the 3-D sticker 5C may be used for promotional advertising, and it may be difficult to predict all of the locations (such as restaurants, amusement parks, sports venues, airports, stores, etc.) where the stickers may be applied, it may be preferable to always employ a waterproof adhesive for layers 90 and 100.

The sixth, bottommost layer of the third embodiment may be a semi-rigid or rigid, plastic release liner 40, or paper/composition release liner, which may be transparent, white, or other colors, depending on the type of aesthetic appeal that is desired for the final sticker assembly.

If using a three-layer differential tape for the construction of the 3-D sticker 5C, the permanent adhesive layer 90 is laminated to the lower surface of the anchor region (that may include an ink layer) after the sticker has already been thermoformed and includes 3-D shapes or structures. Although it is more difficult to laminate a flat tape to thermoformed layers that already include 3-D shapes or structures, the advantage of a flat tape construction is that the sticker will employ a flat layer of adhesive over the entire bottom surface of the assembly. Employing a flat layer of adhesive over the entire bottom surface of the sticker 5C provides a stronger bond for action sports applications and the like.

In the third embodiment of the invention, the anchor region 45 may comprise regions that circumscribe the outer edges of the sticker body 10C, especially around the raised or elevated portions 50, as is depicted in FIG. 3F. FIG. 3G shows the release liner 40 is substantially in the anchor plane 55 instead of conforming to the underside of the elevated portion 50 of the sticker body 10C. FIG. 3H shows the stickers 5C of the third embodiment cannot nest with one another.

The method of manufacture for the third embodiment is disclosed by FIG. 5C. The method for manufacturing the third embodiment sticker 5C is much like the method for manufacturing the second embodiment previously presented in FIG. 5B, and in fact identical, through the step 1220A/1220B for printing the image on the main plastic sheet 15. The sticker construction then proceeds through steps 1270, 1280, and 1290 before ending in step 1299. These steps are similar to what happens in the steps of manufacturing the second sticker embodiment, with the important distinction that instead of first laminating the adhesive layer to the rigid main sheet or flexible/stretchable ink layer, (step 1130 in FIG. 5B) and then thermoforming (step 1150 in FIG. 5B), in FIG. 5C the top layers (30, 15) are first thermoformed (step 1270), and then the lamination of the differential tape occurs at step 1280. This difference results in an airtight cavity 70 being formed underneath the elevated region 50 of the 3-D sticker structure, between the adhesive layer 35C and release liner 40, and the elevated region 50 (see FIG. 3E). Air pressure 110 in the airtight cavity 70 helps the third embodiment sticker 5C retain its 3-D structure in demanding environments. Further, the 3-D sticker according to the third embodiment will retain its shape after the release liner 40 is removed, which translates into an advantage over the prior art because it means that the sticker can be repositioned without losing its 3-D shape.

FIGS. 4A-B and 4C-D show novel 3-D stickers that can stack and nest.

5.4 Fourth Embodiment

Presented in FIGS. 6A-F is a fourth embodiment of a three-dimensional sticker 5D. The fourth embodiment is a multi-part three-dimensional sticker, wherein the parts can be separated from each other for easier transport and installation. This includes at least two separate parts: a three-dimensional body or bodies and an anchor gasket sheet.

Referring to FIG. 6A-6C, the three-dimensional bodies (115A, 115B) include an anchor region 45 and an elevated region 50. The anchor region 45 has a top surface 117 (shown in more detail in FIG. 6D). The elevated region 50 and the anchor region 45 meet at a transition 118 that defines a shape. The bodies (115A, 115B) are formed from a rigid thermoformable plastic layer that is 10 mil-125 mil thick and a flexible/stretchable ink layer adhered to the rigid plastic layer.

The three-dimensional bodies (115A, 115B) are constructed in a similar fashion to the elevated regions that are described in the first and second embodiments; except the adhesive layer and release liner are omitted from the elevated regions. The ink layer may be applied to the top surface (first side) of the rigid plastic layer and may further include a clear ink, varnish, or plastic over laminate that includes an adhesive layer. Alternatively, if the rigid plastic layer is clear or transparent, the ink image may be printed in reverse on the bottom surface (second side) of the rigid plastic layer. The inks used (either on the top or bottom surface) may be UV or LED curable inks, a white ink, metallic ink, reflective ink or iridescent ink. The ink layer may have a high resolution image that is distortion printed, and may include a portion that is semi-transparent. The rigid plastic layer may be white or transparent and the ink and plastic layer may be thermoformed into at least one three-dimensional shape.

The second part is an anchor gasket sheet 120 that includes (1) a semi-rigid or rigid flat sheet which is preferably constructed from plastic, but may be paper, (2) an anchor gasket ink layer that may be printed on the top or bottom surface (first or second side) of the semi-rigid or rigid flat sheet, and (3) a removable or repositional adhesive layer adhered to the anchor gasket ink layer, or alternatively the adhesive layer may be adhered directly to the semi-rigid or rigid flat sheet. The adhesive layer may be comprised of a single layer or it may include a three sub-layer construction. The anchor gasket sheet 120 further employs complementary cutouts (125A, 125B) that conform substantially to the transition shapes—i.e., the shapes of the three-dimensional bodies (115A, 115B). This is shown in more detail in FIG. 6D, where the anchor gasket sheet 120 has two complementary cutouts (125A, 125B) that are configured to fit over the two three-dimensional bodies (115A, 115B). The anchor gasket sheet may further include a release liner detachably adhered to the removable or repositional adhesive layer.

When the three-dimensional sticker 5D is mounted to the display surface the release liner is removed by the end user, and the complementary cutouts (125A, 125B) surround the three-dimensional bodies (115A, 115B) that are adjacent to the transition 118 wherein the exposed removable adhesive layer adheres to the top anchor surface 117, and finally the three-dimensional sticker is ready to mount to the display surface. These features are shown in more detail in FIG. 6C. The anchor region 45 stabilizes the 3-D bodies at the display surface, while also providing a top surface 117 onto which the removable adhesive layer of the anchor gasket sheet 120 can adhere, thus, preventing the three-dimensional bodies (115A, 115B) from moving or shifting relative to the display surface. Further, the transition 118, of the elevated region 50 and anchor region 45, provides lateral strength to the three-dimensional body (115A, 115B).

The ink layer that is printed on the three-dimensional body or bodies, and the ink layer on the anchor gasket sheet, may be applied to the top surface of either construction, and may further include a clear ink, varnish, or plastic over laminate that includes an adhesive layer. Alternatively, the ink layer may be applied to the bottom surface (second side) of the rigid plastic layer (three-dimensional body or bodies), or the semi-rigid or rigid flat sheet (anchor gasket sheet). The inks used (either on the top or bottom surface) may be UV or LED curable inks, a white ink, metallic ink, reflective ink or iridescent ink. The ink layer may employ a high resolution image that is distortion printed, and may include a portion that is semi-transparent.

There are several benefits for having a multi-part separable or deconstructable three-dimensional sticker. First, the sticker is easier to manufacture, and additionally the final appearance is aesthetically more pleasing. When the three-dimensional body or bodies are distortion printed, the registration at the bottom edge (i.e., at the transition) of the 3-D structure(s) can shift so the bottom edge may look uneven or unpleasing. By employing an anchor gasket sheet to cover over the uneven edges where the registration has shifted the three-dimensional sticker has a more polished look.

Second, because the three-dimensional sticker can be deconstructed as shown in FIG. 6E, it can be assembled in a space-saving/transportable configuration (see also FIG. 6F) wherein the anchor gasket sheet 120 is (1) separated from the three-dimensional bodies (115A, 115B) and (2) envelops the three dimensional bodies (115A, 115B). This allows for a more space efficient and protected means of shipping the three-dimensional sticker 5D. This is simply not possible without deconstruction, as illustrated in FIG. 6A, where the three-dimensional sticker 5D cannot be rolled in the direction of arrow 122 because this action is stymied by three-dimensional body 115B, nor can the sticker be rolled in the direction of arrow 124 because of the three-dimensional body 115A. It is clear that a deconstructable three-dimensional sticker is unique and extremely useful.

Upon receiving the deconstructed three-dimensional sticker 5D, the end user removes the anchor gasket sheet release liner 135 from the anchor gasket sheet 120, and inserts the three-dimensional bodies (115A, 115B) into the appropriate cutouts (125A, 125B). The adhesive on the anchor gasket sheet 120 adheres to the top surface 117, fixing the three-dimensional bodies (115A, 115B) to the anchor gasket sheet 120. The assembled three-dimensional sticker is now ready to easily position on a display surface. It should be further noted that the anchor gasket sheet 120 is preferably made from a semi-rigid or rigid flat sheet that is not flimsy—a flimsy sheet may fold back on itself and make it difficult to precisely position the sticker on a display surface. A semi-rigid or rigid anchor sheet enhances the end user's ability to easily position the three-dimensional sticker.

FIGS. 7A-7C illustrate yet another way the deconstructable three-dimensional sticker 5D can be assembled and transported. In FIG. 7A the anchor gasket release liner 135 may be separated from the anchor gasket sheet 120, and the three-dimensional body 115C is inserted into a complementary cutout 125C. Then the top surface 117 of the anchor region 45 adheres to the removable adhesive layer of the anchor gasket sheet 120. The anchor gasket sheet 120 which has been pre-assembled and mated to the three-dimensional body 115C, is then removably adhered to a transport sheet 140 (shown in FIGS. 7B and 7C). The transport sheet 140 may be rigid, and provide support to the sticker during transport. Upon receiving the sticker 5D, the end user may then separate the anchor gasket sheet 120 which has been pre-assembled and mated to the three-dimensional body 115C from the transport sheet 140, and the sticker may be easily applied to a display surface. FIG. 7C show a light 65, that may be removably adhered to the transport sheet 140, whereupon the pre-assembled three-dimensional sticker 5D is placed over the light 65, and is also removably adhered to the transport sheet 140. FIG. 8 illustrates the transport sheet configuration of FIGS. 7B and 7C, where the transport sheet 140 has an eyelet 150 through which a hanger post 155 may be inserted.

The invention has been described in connection with specific embodiments that illustrate examples of the invention but do not limit its scope. Unless indicated otherwise, any feature, aspect or element of any of these example embodiments may be removed from, added to, combined with or modified by any other feature, aspect or element. As will be apparent to persons skilled in the art, modifications and adaptations to be above-described example embodiments of the invention can be made without departing from the spirit and scope of the invention, which is defined only by the following claims.

The invention claimed is:

1. A multi-part three-dimensional sticker, comprising:
a three-dimensional body that includes an elevated region and an anchor region with a top anchor surface, wherein the elevated region and anchor region meet at a transition and the transition defines a transition shape, the three-dimensional body further comprising a rigid thermoformable plastic layer that is 10 mil-125 mil thick and a flexible/stretchable ink layer adhered to the rigid plastic layer;
an anchor gasket sheet comprising:
a semi-rigid or rigid flat sheet constructed from plastic or paper;
an ink layer adhered to the flat sheet;
an adhesive layer comprising a repositionable adhesive;
a complementary cutout that conforms substantially to the transition shape;
wherein the anchor gasket sheet is constructed such that when the three-dimensional sticker is mounted to a display surface:
the complementary cutout surrounds the three-dimensional body adjacent to the transition; and
the adhesive layer adheres to the top anchor surface and a display surface.

2. The sticker of claim 1, wherein the adhesive layer is removably adhered to a rigid transport sheet.

3. The sticker of claim 2, wherein the transport sheet comprises an eyelet constructed to accept a hanger post.

4. The sticker of claim 1, further comprising a transportable configuration wherein the anchor gasket sheet is (1) separated from the three-dimensional body and (2) envelops the three dimensional body.

5. The sticker of claim 1, wherein:
the anchor gasket sheet adhesive layer comprises:
a first adhesive sub-layer comprised of a permanent adhesive adhered to the ink layer;
a second adhesive sub-layer comprised of a carrier sheet adhered to the first adhesive sub-layer;
a third adhesive sub-layer comprised of a repositionable adhesive adhered to the second adhesive sub-layer; and
wherein a release liner is detachably adhered to the third adhesive sub-layer.

6. The sticker of claim 1, wherein:
the anchor gasket sheet adhesive layer comprises:
a first adhesive sub-layer comprised of a permanent adhesive adhered to the flat sheet;
a second adhesive sub-layer comprised of a carrier sheet adhered to the first adhesive sub-layer;
a third adhesive sub-layer comprised of a repositionable adhesive adhered to the second adhesive sub-layer; and
wherein a release liner is detachably adhered to the third adhesive sub-layer.

7. The sticker of claim 1, wherein the adhesive layer is applied to the flat sheet.

8. The sticker of claim 1, wherein the flat sheet is white or transparent.

9. The sticker of claim 1, wherein the rigid thermoformable plastic layer is white or transparent.

10. The sticker of claim 1, wherein the three-dimensional body flexible/stretchable ink layer and/or anchor gasket sheet ink layer is comprised of UV and/or LED curable inks.

11. The sticker of claim 1, wherein the three-dimensional body flexible/stretchable ink layer and/or anchor gasket sheet ink layer is comprised of a white ink layer.

12. The sticker of claim 1, wherein the flat sheet and/or rigid thermoformable plastic layer is transparent and colored inks are used for printing at least a portion of an image, and the image is semi-transparent.

13. The sticker of claim 1, wherein the three-dimensional body flexible/stretchable ink layer and/or anchor gasket sheet ink layer is distortion printed.

14. The sticker of claim 1, wherein the three-dimensional body flexible/stretchable ink layer and/or anchor gasket sheet ink layer is comprised of metallic, reflective and/or iridescent inks.

15. The sticker of claim 1, wherein the rigid thermoformable plastic layer and flat sheet have a top and bottom surface, and the flexible/stretchable ink layer may be adhered to either the top or bottom surface.

16. The sticker of claim 1, wherein the anchor gasket sheet further comprises a transparent protective layer adhered to the ink layer.

17. The sticker of claim 1, wherein the three-dimensional body further comprises a transparent protective layer adhered to the flexible/stretchable ink layer.

18. The sticker of claim 1, wherein the adhesive layer is waterproof.

19. The sticker of claim 1, further comprising a light positioned substantially under the elevated region when the three-dimensional sticker is mounted to the display surface or a transport sheet.

20. The sticker of claim 19, wherein the light has a self-contained power source.

21. The sticker of claim 19, wherein the light has a wireless remote control.

* * * * *